US012269089B2

(12) United States Patent
Schmuland et al.

(10) Patent No.: US 12,269,089 B2
(45) Date of Patent: Apr. 8, 2025

(54) 3D PRINTING SYSTEM WITH MOVING BUILD MODULE

(71) Applicant: Freeform Future Corp., El Segundo, CA (US)

(72) Inventors: Derek Schmuland, El Segundo, CA (US); Tasso Lappas, Pasadena, CA (US); Daniel Roszhart Zehr, Erie, CO (US)

(73) Assignee: Freeform Future Corp., Hawthorne, CA (US)

( * ) Notice: Subject to any disclaimer, the term of this patent is extended or adjusted under 35 U.S.C. 154(b) by 32 days.

(21) Appl. No.: 17/944,901

(22) Filed: Sep. 14, 2022

(65) Prior Publication Data

US 2023/0079964 A1    Mar. 16, 2023

Related U.S. Application Data

(60) Provisional application No. 63/246,724, filed on Sep. 21, 2021, provisional application No. 63/244,355, (Continued)

(51) Int. Cl.
*B22F 10/25* (2021.01)
*B22F 12/00* (2021.01)
(Continued)

(52) U.S. Cl.
CPC .............. *B22F 10/25* (2021.01); *B22F 12/22* (2021.01); *B22F 12/41* (2021.01); *B22F 12/45* (2021.01);
(Continued)

(58) Field of Classification Search
CPC .......... B22F 10/25; B22F 12/22; B22F 12/41; B22F 12/45; B22F 12/90; B22F 10/28;
(Continued)

(56) References Cited

U.S. PATENT DOCUMENTS

2014/0065194 A1\* 3/2014 Yoo ....................... B29C 64/106
425/375
2015/0352664 A1  12/2015 Errico et al.
(Continued)

OTHER PUBLICATIONS

The PCT Search Report and Written Opinion mailed Dec. 15, 2022 for PCT application No. PCT/US22/43613, 16 pages.
(Continued)

*Primary Examiner* — Anthony M Liang
*Assistant Examiner* — Danny N Kang
(74) *Attorney, Agent, or Firm* — Lee & Hayes, P.C.

(57) ABSTRACT

A 3D printing system uses heat sources, such as lasers, for manufacturing parts in metal additive manufacturing, such as powder-bed fusion, on one or more movable build modules. The build modules may be moved (e.g., by a conveyor system) into and out of a lasing module. Parts may be manufactured on multiple build modules simultaneously and/or sequentially, in some cases while the build module(s) are moving relative to the heat sources. Sensor(s) are arranged to determine a position, orientation, and/or movement of the build modules and feedback from the sensor(s) may be used to control the heat sources to compensate for motion of the build modules.

6 Claims, 11 Drawing Sheets

Related U.S. Application Data filed on Sep. 15, 2021, provisional application No. 63/244,364, filed on Sep. 15, 2021.

(51) Int. Cl.
- *B22F 12/41* (2021.01)
- *B22F 12/45* (2021.01)
- *B22F 12/90* (2021.01)
- *B33Y 10/00* (2015.01)
- *B33Y 30/00* (2015.01)

(52) U.S. Cl.
CPC .............. *B22F 12/90* (2021.01); *B33Y 10/00* (2014.12); *B33Y 30/00* (2014.12)

(58) Field of Classification Search
CPC ......... B22F 12/33; B33Y 10/00; B33Y 30/00; Y02P 10/25

See application file for complete search history.

(56) References Cited

U.S. PATENT DOCUMENTS

| | | |
|---|---|---|
| 2018/0178449 A1 | 6/2018 | Cheverton et al. |
| 2019/0381723 A1 | 12/2019 | Maier |
| 2020/0147867 A1 | 5/2020 | Gold |
| 2020/0316854 A1 | 10/2020 | Daniels et al. |
| 2020/0376553 A1* | 12/2020 | DeMuth ................ G02F 1/0136 |
| 2023/0085428 A1 | 3/2023 | Schmuland |

OTHER PUBLICATIONS

The PCT Search Report and Written Opinion mailed Dec. 22, 2022 for PCT application No. PCT/US22/43620, 16 pages.

Office Action for U.S. Appl. No. 17/944,883, mailed on May 8, 2024, Schmuland, "Lasing Module for 3D Printing System", 20 pages.

* cited by examiner

3D PRINTING SYSTEM WITH MOVING BUILD MODULE

CROSS-REFERENCE TO RELATED APPLICATIONS

This application claims priority to U.S. Provisional Application No. 63/244,355, filed Sep. 15, 2021, entitled "Lasing Module for 3D Printing System," U.S. Provisional Application No. 63/244,364, filed Sep. 15, 2021, entitled "3D Printing System with Moving Build Module," and U.S. Provisional Application No. 63/246,724, filed Sep. 21, 2021, entitled "Lasing Module for 3D Printing System," the entirety of which are herein incorporated by reference.

BACKGROUND

Additive manufacturing or 3D printing offers multiple benefits over traditional manufacturing processes. For example, additive manufacturing allows for more complex parts to be manufactured, eliminating many of the design constraints of previous manufacturing processes. Additionally, additive manufacturing can reduce material cost and waste. However, print times are relatively long and throughput for existing additive manufacturing systems are low compared to conventional manufacturing processes. Also, additive manufacturing techniques have not been as robust, stable, and/or repeatable as conventional manufacturing processes. Accordingly, there is a need for improvements to additive manufacturing processes and techniques.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
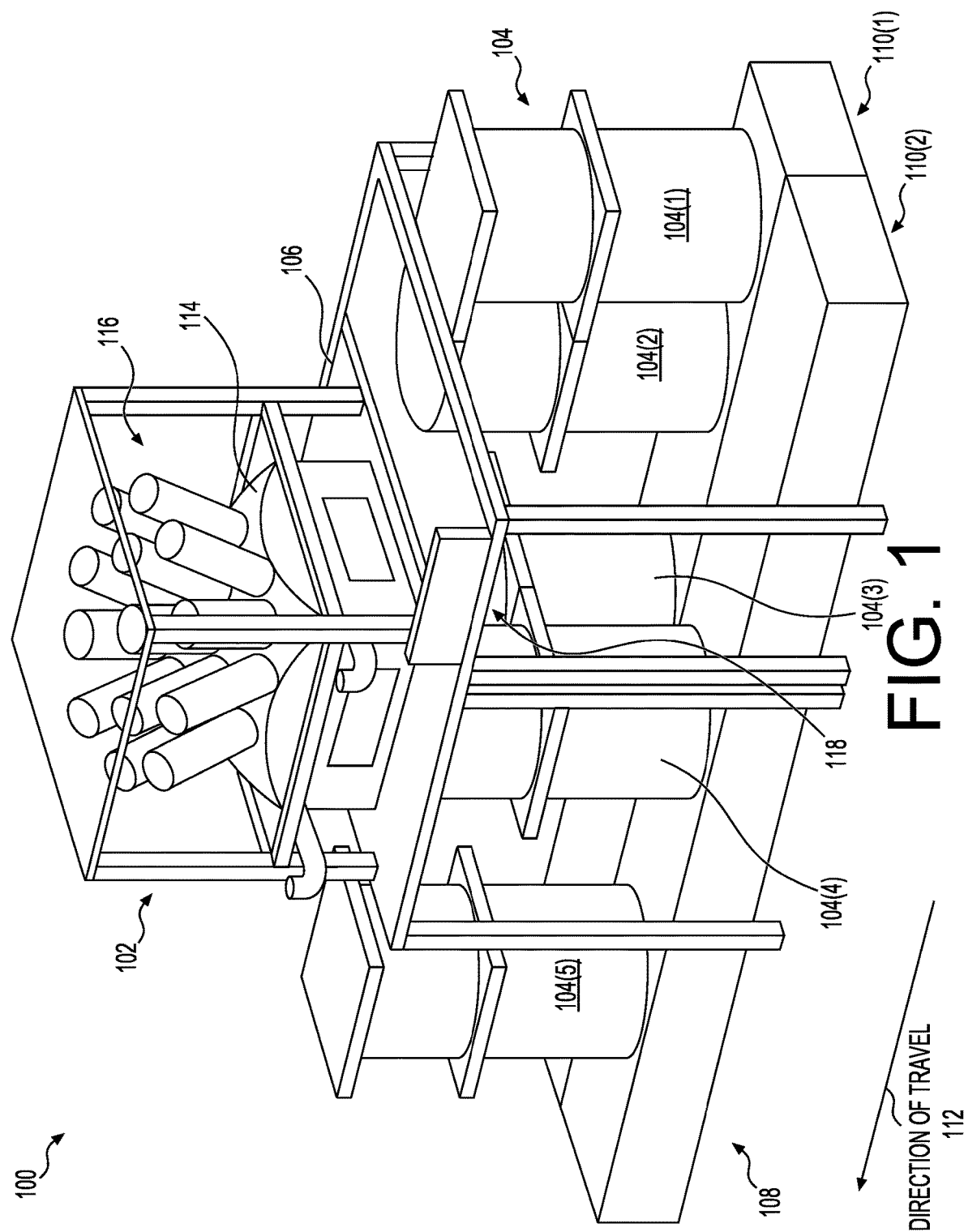
FIG. 1 illustrates an example additive manufacturing system or 3D printing system, according to an example of the present disclosure. As used herein, the terms "additive manufacturing" and "3D printing" are used interchangeably. In some instances, the 3D printing system may include a lasing module disposed above one or more build modules. The lasing module includes a plurality of optical modules having components for melting powdered metal within or on the one or more build modules. A conveyor system may position the one or more build modules relative to the lasing module. In some examples, the conveyor system may move the one or more build modules before, during, and/or after the lasing modules manufacture parts on the one or more build modules. Sensor(s) are used to determine an orientation and position of the build modules, as well as information associated with part(s) being manufactured on the build module(s), respectively.

This patent application describes a 3D printing system that uses heat sources for manufacturing parts in metal additive manufacturing, such as powder-bed fusion, on one or more movable build modules. The build modules may be moved (e.g., by a conveyor system/assembly) into and out of a build area that may be acted on by the heat sources. In some examples, the techniques described herein may be used to manufacture parts on multiple build modules simultaneously and/or sequentially. Additionally, in some examples, the techniques described herein may be used to manufacture parts on one or more build modules while the build module(s) are moving relative to the heat sources.

In powder-bed fusion, powdered metal is selectively melted using lasers (e.g., laser beam, electron beam, thermal print head, etc.) or other heat sources. The 3D printing system described herein may utilize a print head having multiple heat sources, such as lasers, for producing parts with improved precession, accuracy, and repeatability. Mirror(s) may be used to be selectively, and individually, steer the lasers towards particular locations within a build area in which the powdered metal resides and within which the parts are manufactured. Additionally, lens(es) may be used to adjust a focus and/or a spot size of laser beams emitted by the lasers on the build area. The 3D printing system is configured to manufacture parts during a movement of the build area to increase a utilization of the lasers. Sensor(s) are arranged to determine and provide feedback regarding a position, orientation, and/or movement of the build modules for increasing an accuracy and precision in manufacturing parts. For example, feedback from the sensor(s) may be used to adjust the mirror(s) and/or lens(es) of the print head, a speed of the build module, a position of the build module, and so forth. The ability to manufacture a portion of a part on one build module, and while allowing it to cool, manufacture another a portion of another part on a different build module provides for increased throughput and reduced downtime. As such, the systems and methods herein allow for improved throughput, precision, and/or efficiencies in additive manufacturing.

The 3D printing system may, in some instances, include a lasing module and one or more build modules. The lasing module may include lasers that generate the laser beams for melting powdered metal disposed in the build module. In some instances, the lasers reside within or are a component of an optical module. The lasing module includes a structure for receiving a plurality of the optical modules. The structure serves to at least partially orient the optical modules, and therefore the lasers, towards the build module(s) and the build area. For example, in some instances, the lasing module includes a dome-shaped structure (e.g., geodesic dome, hemisphere, etc.) to which the optical modules couple. Coupling the optical modules to the dome-shaped structure disposes the optical modules at various orientations relative to the build module. In turn, the laser beams generated within the optical modules may include different incident angles on the melt pool. In some instances, the lasing module may include any number of optical modules, such as two, four, ten, sixteen, twenty, forty, one hundred, and so forth, and each optical module may include a single laser or multiple lasers (e.g., two, three, four, five, etc.).

In some instances, each of the optical modules may include more than one laser. For example, each optical module may include two lasers. As such, in an example including sixteen optical modules, the lasing module may include thirty-two lasers for manufacturing parts across the build modules. However, it is to be understood that the lasing module may include more than or less than sixteen optical modules and/or each of the optical modules may include more than or less than two lasers. The number of optical modules and lasers may vary based on the size of the build area, the power of the individual lasers, and other factors.

In addition to housing the lasers, the optical modules include mirror(s) and/or lens(es) for directing or "steering" laser beams generated by the lasers towards the build area as well as altering characteristic(s) of the laser beam (e.g., spot size, focal length, etc.). Each of the lasers produce a respective laser beam that is oriented towards the build area using a combination of lens(es) and mirror(s). The mirror(s) and/or lens(es) provide respective beam paths for the laser beams. As discussed in detail herein, a plurality of mirror(s) and/or lens(es) may be used to steer, or otherwise direct, the laser beams towards a particular location or locations within the build area (which may span one or multiple build modules). In doing so, the laser(s) create melt pools of powdered metal and as the melt pools solidify, structures of the part are formed. In some instances, individual lasers may be capable of being steered to all positions within the build area. Moreover, being as the optical modules may couple to the lasing module at different orientations, the lasers may include different incident angles within the build modules and/or on the melt pools. The laser beams generated by the lasers may therefore be steered or otherwise directed to any position on the build area, at a plurality of different angles. Additionally, the ability to direct laser beams onto the build area, while the build modules are moving, further increases a flexibility when manufacturing parts. The laser beams are also allowed to be steered towards multiple build modules passing through/under the lasing module.

The lasing module may also provide a processing chamber in which the powdered metal (e.g., aluminum, steel, etc.) is melted. The optical modules are mounted exterior to the processing chamber in which the powdered metal is melted. Such positioning assists in cooling the optical modules and prevents a buildup of debris or off gases on the optical module during melting of the powdered metal. The 3D printing system may include additional mechanisms for cooling the optical modules. For example, a frame to which the lasers (and other components of the optical module) couple may include, or have coupled thereto, one or more channels, pipes, cavities, or other structures for receiving liquid (e.g., coolant). Various heat sinks, fans, cooling blocks, heat pipes, or the like may also be included.

The lasing module may couple to a frame that disposes the lasing module vertically above (e.g., overhead) the build module(s). In some instances, individual build modules may include a container for receiving powdered metal and within or on which parts are manufactured. Generally, the individual build modules may be positioned in the build area (or a portion of the build area) in which parts are manufactured. Parts may be built within a space defined by the build area. In some instances, the build area may be approximately 750 millimeters (mm)×750 mm. However, the size of the build area may be larger or smaller depending on the size, shape, and other characteristics of parts to be made using the 3D printing system. In some instances, the build area may span across multiple build modules (or portions of multiple build modules), where different parts are manufactured within or across multiple containers. That is, the laser beams of the lasers may be steered across the build area which may span multiple build modules.

The lasing module and the build module may be separate components of the 3D printing system to allow multiple different build modules to be used interchangeably with one or more lasing modules. For example, a conveyor system (or assembly) may permit the build modules to traverse underneath the lasing modules. After parts are manufactured in a particular build module, during a cooling of material within the build module, and/or during a recoating of powdered metal on the build area, another build module may be interchanged with the previous build module beneath a respective lasing module. This allows each lasing module to consistently manufacture parts across a plurality of build modules simultaneously and/or sequentially and with minimal downtime.

In some instances, the conveyor system may include roller(s), belt(s), motor(s), wheel(s), and the like for translating the build modules. For example, the conveyor system may convey the build modules into and out of the build area below the lasing modules. The conveyor system may convey the build modules at certain speeds such that the lasing module is able to track the build modules and compensate for motion of the build modules to melt the powdered metal within the build area as the build modules are in motion. As an example, as a build module is provided to the lasing module, the lasers may begin to melt powdered metal within the build area. As the build module translates beneath the lasing module, the lasers continue to melt the powdered metal. Here, one or more controllers may control the various lens(es), mirror(s), laser(s), and/or other components of the 3D printing system such that the laser(s) are directed to certain locations on the build area for manufacturing the part, while the build module is moving. That is, the controller may cause the mirror(s) to steer the laser beams towards particular locations on the build area, and while accounting for the movement of the build module.

Moreover, as the build module passes beneath the lasing module, an additional build module is provided to the lasing module and the lasers may begin melting powdered metal on another build module that is at least partially aligned or overlapping with the build area. In this sense, the lasers are continuously operational for manufacturing parts across build modules provided to the lasing module. In some instances, the lasers of the lasing module may simultaneously manufacture parts across multiple build modules. Continuing with the above example, as one build module exits the lasing module and another build module is provided to the lasing module, laser(s) may be steered to build areas of the lasing modules, respectively. For example, first laser(s) of the lasing module may be steered to a build area of one build module, and as the other build module is provided to the build area and comes within view, second laser(s) of the lasing module may be steered to a build area of that build module.

In some instances, the conveyor system may include separate paths, tracks, or lanes into the lasing module for conveying the build modules. For example, the conveyor system may include two side-by-side lanes that respectively convey build modules to the lasing module. However, more than two lanes may be included for conveying the build modules to the lasing module. Regardless of the number of lanes, the lasers of lasing module may be steered to respective build areas across the build modules of the different lanes. First laser(s), for example, may be steered to a first build area of a first build module disposed on a first lane of the conveyor system, and second laser(s) may be steered to a second build area of a second build module disposed on a second lane of the conveyor system. Furthermore, the first lane and the second lane may continuously provide build modules to the lasing module such that the lasing module manufactures parts while the build modules are moving. As this occurs, laser(s) of the lasing module may be steered to build areas across build modules within the same lane, or build areas of build modules within different lanes.

Given the movement of the build modules, and the manufacture of parts across different build modules, sensor(s) are disposed to measure the positioning, orientation, movement, and/or specifics of the parts being built within the build modules. The sensor(s) permit for an identification of the build module as well as a localization of the build module relative to the lasing module, and vice versa. For example, the sensor(s) may be used to make corrections in the steering of the laser(s) to respective build areas of the build modules, as well as for knowing the status of parts to be manufactured in the respective build modules (e.g., where to steer the laser beams, a spot size of the laser beams, etc.). In some instances, the sensor(s) may be disposed on the lasing module, the build module, the conveyor system, a portion of a room in which the printing system is housed (e.g., a floor, ceiling, wall, etc.), and/or frames to which the lasing module, the build module, the conveyor system are attached.

The sensor(s) may include range finders (e.g., laser), displacement sensor(s) (e.g., laser), optical encoder(s), scanner(s), camera(s) (e.g., charge-coupled devices (CCDs), active-pixel sensors (CMOS sensors), etc.), computer vision sensor(s), and the like. In some instances, the sensor(s) may include camera(s) that image QR codes, barcodes, marker(s), optical indexes, or other machine-readable identifier(s). The camera(s) image the machine-readable identifier(s) to identify the build modules that are associated with specific parts to be manufactured within the build modules. Such information is utilized when controlling the lasers. For example, as different build modules are provided to the lasing module, the camera(s) image the machine-readable identifier(s) for use in steering the laser beams and/or changing a focus of the laser beams. Based on the machine-readable identifier, a print job database may be accessed for knowing the part (or a portion thereof) to be manufactured within the build module.

Additionally, in some instances, the sensor(s) may measure location, such as a full quaternion (X position, Y position, Z position, roll, pitch, yaw), associated with the build modules. For example, range finders may image encoder tape (e.g., optical or magnetic) coupled to the build modules at fixed, known locations. In some instances, the encoder tape may be disposed in a direction of travel the build module is conveyed. As the optical tape comes within view of the sensor(s), the sensor(s) may image, for example, the optical tape to determine a position and/or orientation of the build module. For example, as the build modules translate along the conveyor system, between lasing modules, and so forth, the build modules may shift in one or more directions. To ensure accuracy and precision in manufacturing parts, the position and/or orientation of the build module is used to correct, or otherwise account for, shifts in the build module. Such information may be used in addition to the information obtained via the machine-readable identifier. Additionally, or alternatively, the sensor(s) may measure distances to the build modules to take into account shifts of the build module. Such distance may be used to determine a displacement of the build modules from the lasing modules.

After the position and/or orientation of the build module is determined, controller(s) may instruct the mirror(s) and/or the lens(es) to adjust (e.g., steering and focus, respectively) based on the determined position, displacement, and/or orientation of the build module. In some instances, first range finders may determine coordinate positions of the build module (e.g., in an X, Y, Z coordinate frame) based on imaging the encoder tape and second range finders may determine a roll, pitch, and yaw of the build module based on imaging surfaces, fiducials, or other structures of the build module. The first range finders and the second range finders may be arranged to image different sides (or surfaces) of the build modules for measuring the full quaternion of the build modules.

The build module, or more generally the 3D printing system, may therefore include sensor(s) to aid in manufacturing parts. In some instances, the 3D printing system may include any number of sensor(s), such as two, four, six, eight, etc. Moreover, as the build modules progress through the lasing modules, respectively, the sensor(s) make regular and continuous measurements for use in correcting the laser beams (e.g., steering, focus, etc.). In some instances, the sensor(s) may have a sampling frequency of three kilohertz (kHz) or above, a resolution of substantially five microns (or below), and/or a repeatability of less than one micron. To assist in the accuracy of the sensor(s), shield(s) or other heatsink(s) may be disposed on and/or around the sensor(s). The shield(s) and/or heatsinks(s) may prevent interference via the laser(s) (e.g., heat).

In some instance, rather than the conveyor system including tracks, motors, and so forth for maneuvering the build modules, additionally or alternatively, the build modules themselves may include components for orienting and transporting the build modules about an environment. For example, the build modules may include motor(s) that maneuver the build modules about the environment, such as through the lasing module as parts are being manufactured, across lasing modules within the environment, while parts are cooling, and so forth. In some instances, the build modules may maneuver about the environment on a system of tracks, or may freely maneuver about a floor. In some instances, the build modules may include sensors for imaging fiducials in order to properly maneuver the build modules about the environment. Additionally, the build modules may include actuators that are capable of tilting, or otherwise orienting the build module relative to the lasing module.

The 3D printing system described herein enables sustainable manufacturing of parts with improved manufacturing speed, accuracy, precision, stability, and repeatability. The 3D printing system also reduces manufacturing time, relative to existing 3D printing systems, by manufacturing parts as build modules are in motion relative to lasing modules. Due to the movement of the build modules, the lasers are efficiently utilized with minimal downtime. The movement, although increasing utilization and throughput, introduces complexities to account for such movement and orientation of the build modules. Here, sensor(s) are used to determine a position and/or orientation of the build modules in substantially real-time, which may be fed back to the lasing modules for accurately steering laser beams and/or focusing the laser beams toward the build modules. As such, feedback from the sensor(s) may be used to direct the laser beam(s) toward build areas through which the build modules are moving to account for the movement of the build modules and/or shifts experienced by the build modules. Such process results in improved throughput, scalability, accuracy and precision in manufacturing parts.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting examples. The features illustrated or described in connection with one example may be combined with the features of other examples. Such modifications and variations are intended to be included within the scope of the appended claims.

FIG. 1 illustrates an example 3D printing system 100 used to manufacture parts. In some instances, the 3D printing system 100 includes a lasing module 102 and one or more build modules 104. The lasing module 102 is shown residing vertically above (e.g., overhead) the build modules 104. In some instances, the lasing module 102 (or a structure thereof) couples to a gantry 106 that disposes the lasing module 102 above the build module 104.

As shown in FIG. 1, the build modules 104 may include at least a first build module 104(1), a second build module 104(2), a third build module 104(3), a fourth build module 104(4), and/or a fifth build module 104(5). The first build module 104(1), the second build module 104(2), the third build module 104(3), the fourth build module 104(4), and/or the fifth build module 104(5), as well as other the build modules 104, are configured to pass underneath the lasing module 102 (and/or the gantry 106) such that the lasing module 102 may build parts within a bed of powdered material disposed in containers of the build modules 104, respectively. Each of the first build module 104(1), the second build module 104(2), the third build module 104(3), the fourth build module 104(4), and/or the fifth build module 104(5), as well as other the build modules 104, include respective build areas on which parts are manufactured. For example, containers (e.g., drums, bins, etc.) associated with each of the build modules 104 include a powder bed of powdered metal in which parts are manufactured. The lasing module 102 is therefore arranged to manufacturing parts across the build modules 104.

The build modules 104 may be conveyed via a conveyor assembly or a conveyor system 108 (e.g., tracks, rollers, belts, etc.) into to the lasing module 102. In other words, the conveyor system 108 may move the build modules 104 into and out of the lasing module 102 such that parts may be built across the build modules 104, or across a plurality of build modules 104. In some instances, the conveyor system 108 may be moving while the lasing module 102 is manufacturing parts. That is, the conveyor system 108 (e.g., via motors) may move the build modules 104 as the lasing module 102 is manufacturing parts. However, in some instances, the build modules 104 may be self-propelled and capable of maneuvering themselves within an environment. For example, the build modules 104 may include a motor that maneuvers the build modules 104 through the lasing module 102, between lasing modules 102, and so forth. Here, the build modules 104 may be disposed on a tracks, rails, and the like, or the build modules 104 may freely traverse about the environment. In some instances, the build modules may include sensors for imaging fiducials in order to properly maneuver the build modules 104 about the environment.

In some instances, the lasing module 102 and the build module 104 may be in communication with one another. For example, the lasing modules 102 and the build module 104 may include network interfaces that enable communication over one or more network(s) (e.g., Bluetooth, Zigbee, Wi-Fi, etc.). The build module 104 may transmit information associated with a location of the build module 104 to the lasing module 102 for use in steering laser beams towards build areas within the build module 104. The build module 104 may also receive instructions as to places within the environment in which the build module 104 is to travel.

In some instances, the conveyor system 108 may include multiple lanes on which the build modules 104 are disposed, or along which the build modules 104 traverse. For example, the conveyor system 108 may include a first lane 110(1) and/or a second lane 110(2). The first lane 110(1) and the second lane 110(2) may respectively convey the build modules 104 into the lasing module 102. That is, with reference to FIG. 1, the first build module 104(1), the second build module 104(2), and the third build module 104(3) are shown being disposed in the first lane 110(1). The fourth build module 104(4) and the fifth build module 104(5) are shown being disposed in the second lane 110(2). As such, the first lane 110(1) may provide the first build module 104(1), the second build module 104(2), and the third build module 104(3) to the lasing module 102, and the second lane 110(2) may provide the fourth build module 104(4) and the fifth build module 104(5) to the lasing module 102.

In some instances, the build modules 104 may be provided to the lasing module 102 in a direction of travel 112 (as indicated by the arrow). As the build modules 104 are conveyed on the conveyor system 108, and pass beneath the lasing module 102, the lasing module 102 may begin manufacturing parts within the build areas of the build modules 104, respectively. In this sense, the lasing module 102 may manufacture parts while the build modules 104 are moving along the conveyor system 108, and may manufacture parts across the build modules 104 (e.g., between powder beds disposed on/within the build modules). For example, as discussed herein, the lasing module 102 includes lasers that are steered (e.g., via mirrors) to locations on the build areas for melting the powdered metal. With reference to FIG. 1, the third build module 104(3) and the fourth build module 104(4) are shown residing beneath the lasing module 102. Laser(s) of the lasing module 102 may generate beams that are steered to a build area of the third build module 104(3) and the laser(s) (whether the same or different laser(s)) generate beams that are steered onto a build area of the fourth build module 104(4).

The laser(s) within the lasing module 102 may be capable of reaching build areas (or a portion of the build areas) within each of the third build module 104(3) and the fourth build module 104(4). Although not shown in FIG. 1, the build modules 104 (or other ports of the 3D printing system) may include a reservoir that stores the powdered metal. In some instances, a rake or other mechanism may supply the powdered metal into the build area. For example, as parts are being manufactured, powdered metal may be disposed in a powder bed in layers, one layer at a time, within the build area.

Given the movement of the conveyor system 108, during the melting of powdered metal within the third build module 104(3) and the fourth build module 104(4), other build modules 104 are provided to the lasing module 102. As an example, the second build module 104(2) may be provided to the lasing module 102. Here, laser(s) of the lasing module 102 may generate beams that are steered towards a build area of the second build module 104(2). In this sense, certain laser(s) of the lasing module 102 may be steered to the build area of the third build module 104(3), and as the second build module 104(2) enters the lasing module 102, some of the laser(s) of the lasing module 102 may be steered to the build area of the second build module 104(2). The lasing module 102 may similarly manufacture parts within additional build modules 104 in the second lane 110(2), after the fourth build module 104(4). As such, the lasing module 102 may direct laser beams generated by the laser(s) across a plurality of build modules 104 within the same lane, and across different lanes.

After the build modules 104 pass through (e.g., beneath) the lasing module 102, the build modules 104 may be conveyed to different lasing modules, or may be conveyed (via conveyors not shown) back into the lasing module 102. For example, after passing through the lasing module 102, the powdered metal within the build modules 104 may be allowed time to cool (e.g., cure) before additional coats of powdered metal are deposited onto the build area and/or before additional manufacturing takes place. As an example, after passing through the lasing module 102, the fifth build module 104(5) may be recirculated (via conveyors not shown) back to the lasing module 102. During this recirculation, the powdered metal within the fifth build module 104(5) may cure and cool before additional melting takes place. Additionally, the build area of the fifth build module 104(5) may be recoated with additional layer(s) of powdered metal.

In some instances, each of the lanes of the conveyor system 108 may be independently controlled to provide the build modules 104 to the lasing module 102. For example, the first lane 110(1) may provide the build modules 104 at a first speed into and through the lasing module 102, while the second lane 110(2) may provide the build modules 104 at a second speed into and through the lasing module 102. In some instances, the speeds may be different or similar.

The lasing module 102 includes a housing 114 that receives a plurality of optical modules 116. The housing 114 may include a top, a bottom, and sides. The top (e.g., ceiling) is shown being disposed vertically away from the build modules 104, whereas the bottom is shown being disposed adjacent to the build modules 104. The sides are shown disposed between the top and the bottom. In some instances, the top of the housing 114 may be spaced apart from the build modules 104 by a distance that permits the optical modules 116 to manufacture parts within a build area having dimensions of, for example, 750 mm×750 mm. This build area may span across multiple build modules 104, within the same or different lanes.

In some instances, the sides may include one or more windows that permit viewing of the build area in which parts are manufactured. The top, the bottom, and the sides may collectively define a cavity, such as a processing chamber, within which the parts are manufactured. As such, the bottom may be open-end such that laser beams generated by the optical modules 116 may be transmitted to the build modules 104 (and the powdered metal within the build areas) for building parts. The processing chamber may act as a hood for controlling off gases and/or soot generated via melting the powdered metal. Additionally, although not shown in FIG. 1, one or more hoses (or other ductwork) may be fluidly connected to the housing 114. A supply hose, for example, may supply air or shielding gas into the processing chamber, while an exhaust hose may draw air or other gasses from within the processing chamber (e.g., via a fan). The supply hose and the exhaust hose may prevent a buildup of off gases and/or soot generated during a manufacture of the parts (e.g., vaporized powdered metal).

The profile of the top of the housing 114 orients the optical modules 116 at a plurality of angles relative to the build modules 104 (and therefore the build areas). For example, as shown, the optical modules 116 may be situated as an array, across and about the top, so as to be oriented towards the build areas of the build modules 104. In some instances, any number of optical modules 116 may couple to the top, or stated alternatively, the lasing module 102 may include any number of the optical modules 116. Additionally, the optical modules 116 themselves may include any number of laser(s) that generate respective laser beams directed towards the build areas. For example, the optical modules 116 may include two lasers, where each of the laser beams generated by lasers may be independently or collectively (e.g., clustered) steered (e.g., via mirror(s)). As such, the lasers may be used individually and collectively when manufacturing parts. Additionally, lens(es) of the optical modules 116 may control a spot size of the laser beams on the build areas. An optical pathway of the laser beams may be modified to steer the laser beam toward selective portions of the surface of the powder bed to melt powdered metal, thus creating melt pools at the selected portions of the powder bed surface.

The build modules 104, as discussed above, may move in and out of the lasing module 102 as parts are manufactured across the build modules 104. Discussed herein, sensor(s) may image fiducials, encoder tape, or other markers (e.g., barcodes, QR codes, etc.) on the build modules 104 to account for the movement, position, and/or orientation of the build modules 104. In some instances, the sensor(s) may be arranged on the lasing module 102, the build module 104, the gantry 106, the conveyor system 108, and/or other frames within the environment. Based on the movement, position, and/or orientation of the build modules 104, the laser beams may be steered to certain positions within the build areas and/or the laser beams may be focused to create certain spot sizes. As such, the sensor(s) may measure a velocity at which the build modules 104 pass underneath the lasing module 102, as well as a relative position of the build module 104 to the lasing module 102, thereby allowing the lasing module 102 to manufacture parts while the build modules 104 are moving. Furthermore, as the build modules 104 enter the lasing module 102, the sensor(s) may image the markers for obtaining information associated with the part being manufactured within particular build modules.

This allows the optical modules 116 (or the lasers) to be instructed (e.g., steered) for manufacturing the part. For example, after the markers are imaged, such image(s) may be used to determine a progress of the part, a step in manufacturing the part, a location of the part within the build module, and so forth. Such information is used to control the optical modules 116 for manufacturing the part.

In some instances, a recoater 118 may be located on a side of the lasing module 102 for applying layers of powdered metal within build areas of the build modules 104. While this process is occurring, other build modules 104 may be conveyed into the processing chamber. Here, additional parts are manufactured. In such instances, a downtime of the lasers is minimized and the lasers are utilized for consistently manufacturing parts. The recoater 118, although shown as residing at a particular location, such as before the lasing module 102 in the direction of travel 112, may reside elsewhere. For example, additionally or alternatively, the recoater 118 may be located on another side of the lasing module 102, and recoat the build modules 104 after the build modules 104 pass through the lasing module 102. As such, the recoater(s) 118 may be located before and/or after the lasing module 102 for supplying additional powdered material to the build areas of the build modules 104, either subsequent to exiting the lasing module or prior to entering the lasing module 102. In doing so, while recoating is occurring for one build module 104, the lasing module 102 may be manufacturing a part on another build module to reduce a downtime of the lasing module 102.

Although FIG. 1 illustrates a certain number of build modules 104 disposed on the conveyor system 108 (e.g., five), the conveyor system 108 may convey more than or less than the number of build modules 104 shown in FIG. 1. Additionally, the build modules 104 may be provided to different lasing modules 102, and the conveyor system 108 may at least assist in transferring the build modules 104 across different multiple lasing modules 102. Moreover, the conveyor system 108 may include more than two lanes for providing the build modules 104 to the lasing module 102. Still, in some instances, separate conveyor systems may provide the build modules 104 to the lasing module 102. Here, the conveyor system 108 may respectively provide build modules 104 to the lasing modules 102. As such, it is to be understood than an environment may include any number of lasing modules 102, build modules 104, and conveyor systems 108 to convey the build modules 104.

Additionally, although the disclosure herein describes that the build modules 104 are moving while parts are manufactured, in some instances, the build modules 104 need not be moving and the lasing module 102 may be used to manufactured parts while the build modules 104 are stationary. For example, there may be some instances, such as large or complex parts, where the build module 104 is slowed or stopped below the lasing module 102 for a period of time.

The direction of travel 112 illustrated in FIG. 1 is illustrative, and other directions of travel are envisioned. For example, the conveyor system 108 may be di-directional and translate the build modules 104 in multiple directions, such as the direction of travel 112, transverse to the direction of travel 112, opposite the direction of travel 112, etc. Still, the conveyor system 108, or the build module 104, may include components for rotating the build module 104 relative to the lasing module 102. Additionally, the 3D printing system 100 may include more than or less than two lanes that provide the build modules 104(1)-(5) to the lasing module 102. For example, the 3D printing system 100 may include a single lane that transports build modules 104 to the lasing module 102. Here, while the lasing module 102 is manufacturing a part within one build module, the recoater 118 may be applying an additional layer of powdered metal to an additional build module. Such processes may be performed while the build modules 104 are being conveyed to increase a utilization of the lasers.

FIG. 1 therefore illustrates that the 3D printing system 100 may have the ability to print a portion of a part on one build module 104, move the build module out from underneath the lasing module 102, and allow the build module 104 to cool/recoat. During this process, a portion of another part on a different build module 104 may be manufactured. This occurs without stopping and with minimal downtime. Additionally, the lasing module 102 may direct lasers across the build modules 104 to cycle between print jobs.

Figure 2:
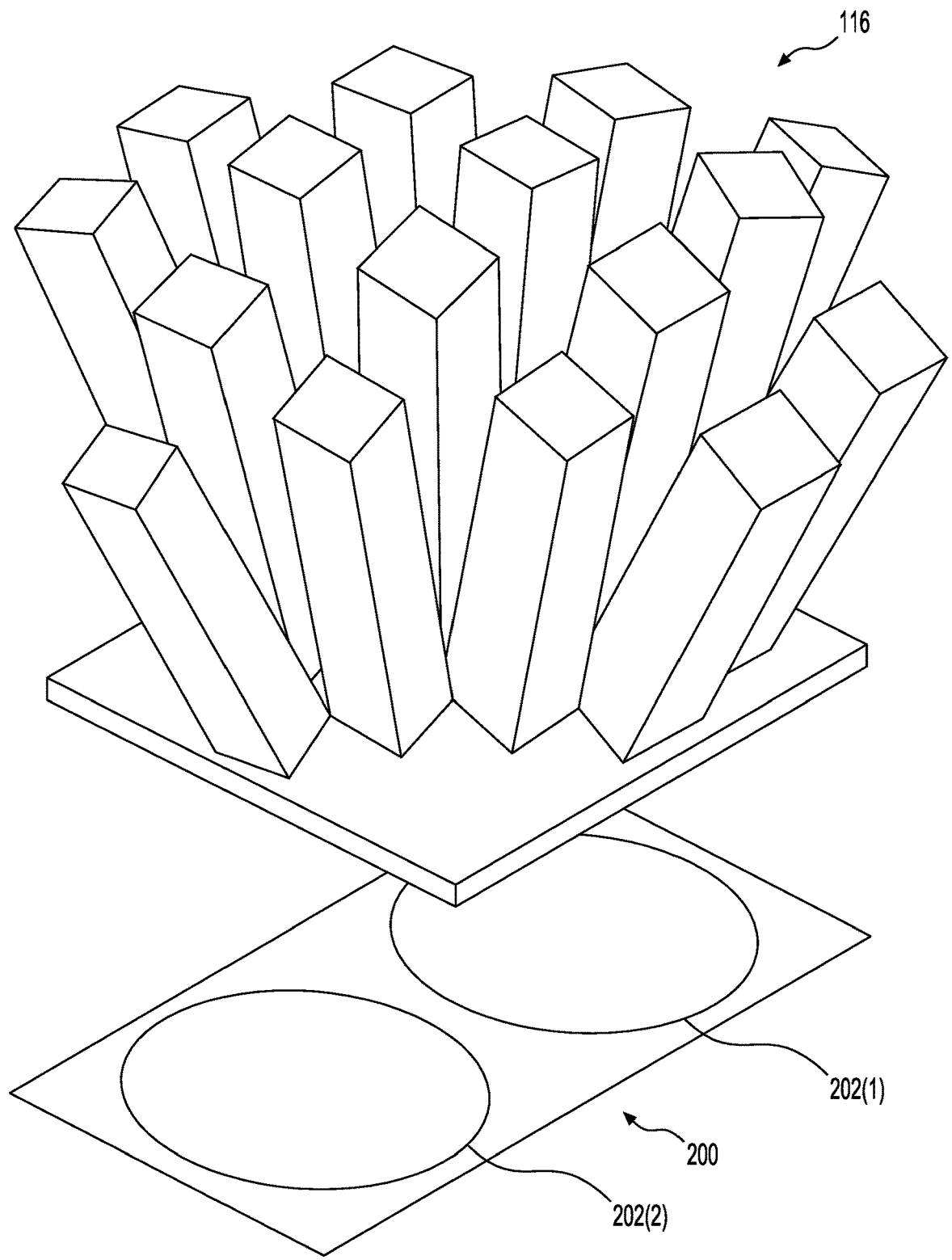
FIG. 2 illustrates an example lasing module of the 3D printing system of FIG. 1 and an example build area, according to an example of the present disclosure.

FIG. 2 illustrates an example build area 200 disposed beneath the optical modules 116 of the lasing module 102, such that the optical modules 116 are mounted overhead of the build area 200.

In some instances, the build area 200 may be include at least a first portion 202(1) and a second portion 202(2). In reference to FIG. 1, the first portion 202(1) may be disposed within the third build module 104(3), and the second portion 202(2) may be disposed within the fourth build module 104(4). As such, the lasing module 102 may be configured to manufacture parts on separate powder beds of the build modules 104 at the same time. In some instances, each of the optical modules 116 of the lasing module 102 may be capable of being steered towards a portion, or all of, the build area 200 (e.g., mirror(s)). In such instances, the field of views of the individual optical modules 116, or the lasers contained therein, may overlap. In some instances, the field of view of the lasers may be substantially the same, or equal to, the build area 200. For example, the optical modules 116 may be arranged such that all of the lasers within the optical modules 116 may be steered towards any position within the build area 200.

The laser beams generated within the optical modules 116 may be steered towards the first portion 202(1) and/or the second portion 202(2), depending on the parts being manufactured within the third build module 104(3) and the fourth build module 104(4), respectively, an amount of the first portion 202(1) and/or the second portion 202(2) within the view of view of the lasers, a velocity of the third build module 104(3) and the fourth build module 104(4), respectively, a placement of the optical modules 116 on the lasing module 102, an orientation of the optical modules 116, availability, the part being manufactured, and so forth. However, in some instances, the farther the laser beams are directed from a particular optical module 116, the greater a spot size of the laser beam. Lens(es), for example, may adjust the focal length of the laser beams for maintaining a consistent spot size.

Additionally, or alternatively, rather than steering the laser beams to respective portions in the build area 200, the laser beams may be clustered together to create larger melt pools. In general, a cluster includes two or more laser beams that at least partially overlap each other in a region of the powder bed. For example, laser beam(s) may be clustered together to increase an amount of power directed to a particular location within the build area. This increase in power may create larger spot sizes, or melt pools. Each of the lasers may therefore be independently, or collectively operable to create separate or multiple parts simultaneously, with flexible energy delivery. In turn, this allows the lasers to be highly utilized and continuously operate with minimal downtime. Examples of clustering or beamforming laser beams are described in U.S. patent application Ser. No. 16/773,864 filed Jan. 27, 2020, the entirety of which is herein incorporated by reference.

Although the first portion 202(1) and the second portion 202(2) are shown being circular in shape, the first portion 202(1) and the second portion 202(2) may include different shapes (e.g., square, hexagonal, triangular, etc.). In such instances, the containers and/or the build modules 104 may be of different shapes (e.g., square). In some instances, the build area 200 may include a size of approximately 750 mm×750 mm. Still, the build area 200 may include more than two portions.

Figure 3:
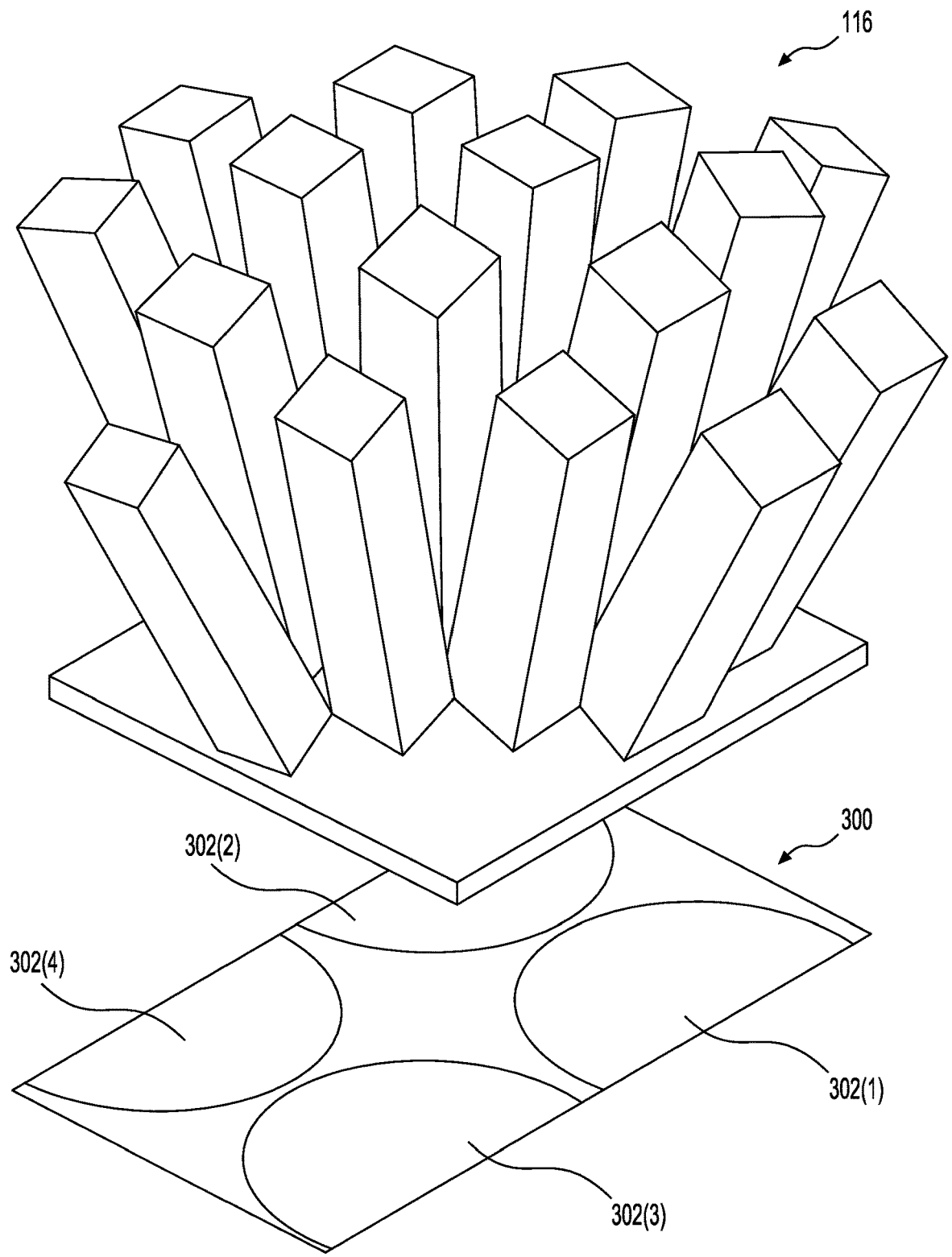
FIG. 3 illustrates an example build area associated with the 3D printing system of FIG. 1, according to an example of the present disclosure.

FIG. 3 illustrates an example build area 300 disposed beneath the optical modules 116 of the lasing module 102. The build area 300 is shown including a first portion 302(1), a second portion 302(2), a third portion 302(3), and a fourth portion 302(4). The first portion 302(1) may be associated with a first build module, the second portion 302(2) may be associated with a second build module, the third portion 302(3) may be associated with a third build module, and the fourth portion 302(4) may be associated with a fourth build module. The portions 302(1)-(4) may be sections of build areas associated with each of the build modules 104. For example, the first portion 302(1) may represent a portion of a build area of the first build module, where other portions of the build area of the first build module may not be within the build area of the lasing module 102 (e.g., out of view of the lasers). Stated alternatively, compared to FIG. 2 in which an entirety of the build area of the build modules 104 were visible to the lasing module 102, FIG. 3 illustrates that portions of build areas of the build modules are outside of the build area 300. In some instances, the first build module and the second build module are disposed in a first lane of a conveyor system, whereas the third build module and the fourth build module are disposed in a second lane of the conveyor system. Multiple lanes may provide the build modules 104 to the lasing module 102.

The optical modules 116 are configured generate laser beams for manufacturing parts across the first portion 302(1), the second portion 302(2), the third portion 302(3), and the fourth portion 302(4). For example, compared to FIG. 2 in which parts are manufactured across two build modules, FIG. 3 illustrates that the lasing module 102 may manufacture parts across four build modules. As such, as the build modules 104 pass underneath the lasing module 102, the laser beams may be steered to manufacture parts across a plurality of build modules.

Although FIG. 3 illustrates that the portions 302(1)-(4) are relatively similar in shape and size, it is to be understood that the differently shaped or sized portions may be within the build area 300. For example, depending upon the complexity of parts being manufactured, certain parts may be manufactured quicker than one other. In such instances, only one build module 104 may be disposed beneath the lasing module 102 in one lane, and one or two build modules 104 may be disposed beneath the lasing module in another lane. As such, the number of build modules 104, or build areas of the build modules 104, beneath the lasing module 102 may be different than shown in FIG. 3.

Figure 4A:
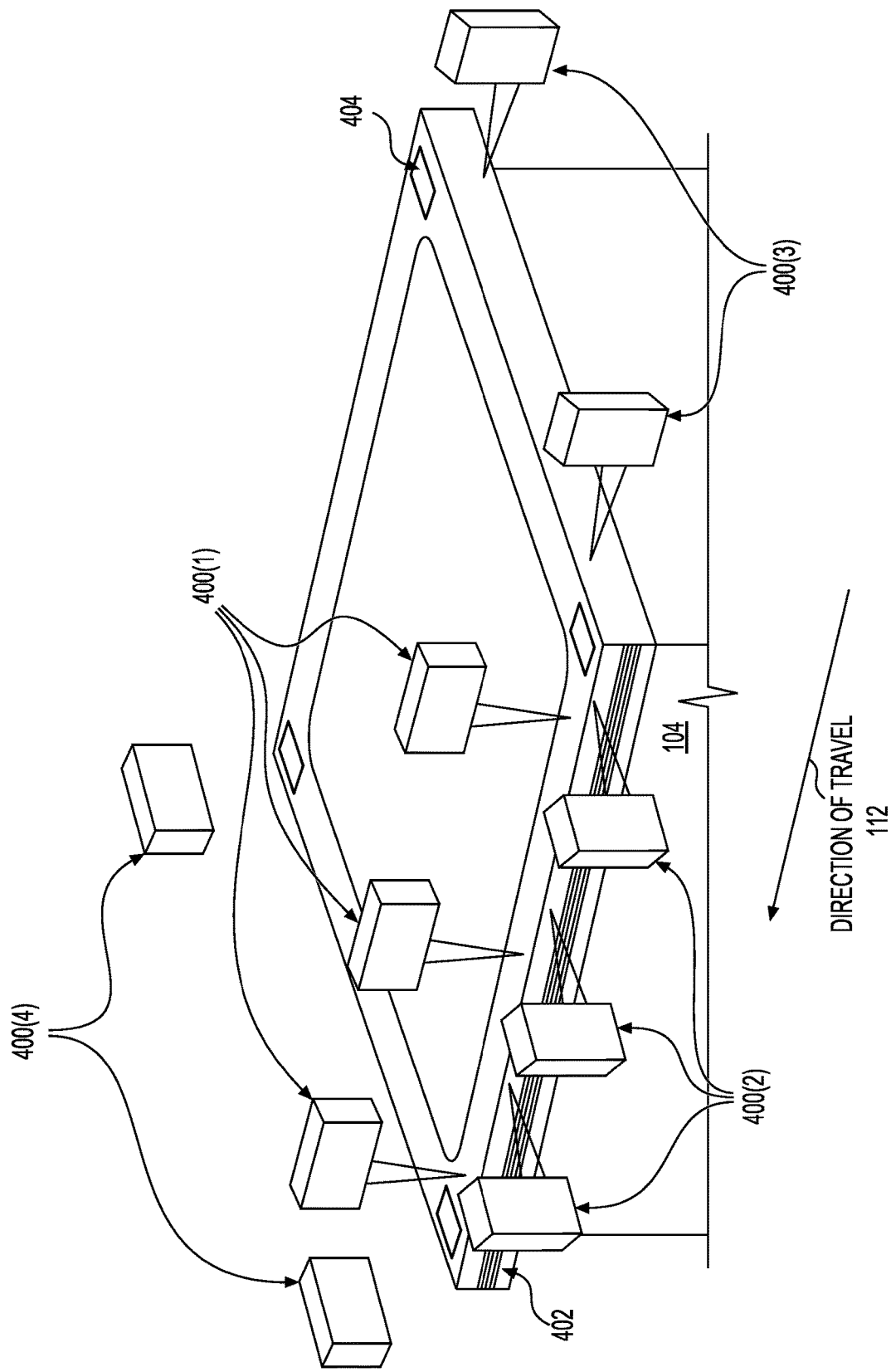
FIG. 4A illustrates example sensors that may be useable with the 3D printing system of FIG. 1, according to an example of the present disclosure.

FIG. 4A illustrates example sensors 400 of the 3D printing system 100. In some instances, the sensor(s) 400 may image fiducials, encoder tape, other markers (e.g., barcodes, QR codes, etc.), on the build modules 104, or the build modules 104 themselves to account for the movement, position, and/or orientation of the build modules 104 relative to the lasing module 102. In some instances, the sensor(s) 400 may be arranged on the lasing module 102, the build module 104, the gantry 106, the conveyor system 108, frames of the 3D printing system 100, and/or other structures within an environment in which the 3D printing system 100 resides.

In some instances, some of the sensor(s) 400 may measure a velocity at which the build modules 104 pass underneath the lasing module 102, as well as a relative position and/or orientation of the build module 104 to the lasing module 102. Based on the movement, position, and/or orientation of the build modules 104, the laser beams may be steered to certain positions within the build areas and/or the laser beams may be focused to create certain spot sizes. Other sensor(s) may image markers or surfaces of the build modules 104 for obtaining information associated with the part(s) being manufactured within a particular build module 104. This allows the optical modules 116 (or the lasers) to be instructed (e.g., steered) for manufacturing the part(s). For example, after the markers are imaged, such image(s) may be used to determine a progress of the part, a step in manufacturing the part, a location of the part within the build module 104, and so forth. Such information is used to control the optical modules 116 for manufacturing the part.

Turning to the sensor(s) illustrated in FIG. 4A, the sensor(s) 400 may include first sensor(s) 400(1), second sensor(s) 400(2), third sensor(s) 400, and/or fourth sensor(s) 400(4). In some instances, the first sensor(s) 400(1), the second sensor(s) 400(2), and/or the third sensor(s) 400(3) may represent laser range finders that are used to determine a quaternion of the build module 104 (or a point of the build module 104). The quaternion represents an X position, Y position, and Z position of the build module 104, as well as roll, yaw, and pitch of the build module 104.

The first sensor(s) 400(1) are shown disposed vertically above the build module 104. In some instances, the first sensor(s) 400(1) are coupled to the gantry 106 and/or the lasing module 102, oriented in a direction towards a top of the build module 104. The first sensor(s) 400(1) may image a top surface of the build module for use in determining a pitch of the build module 104. In some instances, the first sensor(s) 400(1) may image a flange along the top of the build module 104, on a particular side (or surface). Using the first sensor(s) 400(1) a distance to the top of the build module 104 may be calculated. Such distances across the first sensor(s) 400(1), whether similar or different, may be compared for determining a pitch of the build module 104.

The second sensor(s) 400(2) are shown disposed to the side of the build module 104. In some instances, the second sensor(s) 400(2) are coupled to the gantry 106, the lasing module 102, and/or other structures of the 3D printing system 100. Additionally, or alternatively, the second sensor(s) 400(2) may be arranged on a frame spaced vertically below a build plane of the build module 104, and angled upwards towards to image the build module 104. The second sensor(s) 400(2) may therefore be arranged to image a side (or surface) of the build module 104.

In some instances, the second sensor(s) 400(2) are arranged to image an optical tape 402 disposed along a side of the build module 104. Imaging the optical tape 402 may be used to determine X position, Y position, and/or Z position of the build module 104. For example, the through imaging the optical tape 402, a relative position of the build module 104 to the lasing module 102 may be determined. As shown, the optical tape 402 is disposed along the side of the build module 104, in a direction associated with the direction of travel 112.

In some instances, a portion of the second sensor(s) 400(2) are used to determine a position and/or velocity of the build module 104 moving through the lasing module 102.

For example, sensor data generated by the second sensor(s) 400(2) may be compared against one another to determine which of the second sensor(s) 400(2) are providing accurate information (e.g., standard deviation). For example, as the build module 104 exits the lasing module 102, some of the second sensor(s) 400(2) may no longer sense the optical tape 402. Sensor(s) that no longer report data that is consistent, or that are divergent from the other sensor(s), may be ignored.

The third sensor(s) 400(3) are shown disposed along a side of the build module 104 (e.g., back). In some instances, the third sensor(s) 400(3) are coupled to the gantry 106, the lasing module 102, and/or other structures of the 3D printing system 100. As shown, the third sensor(s) 400(3) are arranged to image a side (or surface) of the build module 104. In some instances, the third sensor(s) 400(3) may image a surface of the build module 104 to determine a pitch and/or yaw of the build module 104.

In some instances, the first sensor(s) 400(1), the second sensor(s) 400(2), and/or the third sensor(s) 400(3) may represent laser range finders. In such instances, the first sensor(s) 400(1), the second sensor(s) 400(2), and/or the third sensor(s) 400(3) may output projections and receive reflections associated with the projections. The reflections are used to triangulate a position and/or orientation of the build module 104.

The fourth sensor(s) 400(4) may represent camera(s) that are arranged to image the marker(s) 404 disposed along the top of the build module 104. In some instances, the fourth sensor(s) 400 may be coupled to the lasing module 102 and directed vertically downward for imaging the marker(s) 404. As shown, the marker(s) 404 may be located at corners of the build module 104 and may be used to track the build module 104 throughout the environment. The marker(s) 404, however, may be located elsewhere on the build module (e.g., side). The marker(s) 404 are used to identify the build module 104, specifics of the build module 104 (e.g., size, material, etc.), a part being manufactured within the build module 104, and/or a localization of the build module 104 relative to the lasing module.

In some instances, the second sensor(s) 400(2) may have a sampling rate greater than approximately 300 kHz. The first sensor(s) 400(1), the third sensor(s) 400(3), and/or the fourth sensor(s) 400(4) may have a sampling rate greater than 1 kHz. The second sensor(s) 400(2) may have a latency of less than approximately 3 microseconds, whereas the first sensor(s) 400(1), the third sensor(s) 400(3), and/or the fourth sensor(s) 400(4) may have a latency of less than approximately 1 millisecond.

In some instances, the 3D printing system 100 may include more than or less than the number of sensor(s) 400 shown in FIG. 4A for imaging the marker(s) 404, the optical tape 402, and/or the build module 104. The number of sensor(s) 400, for example, may be based at least in part on a size of the build module 104 and/or a field of view of the laser(s) within the optical modules 116. The frames or components to which the sensor(s) 400 couple may be manufactured from heat resistant materials to reduce expansion when heated. An example material may include, for example, invar. Additionally, the sensor(s) 400 may be shielding via shielding plates or may be cooled to prevent heat affecting a reading of the sensor(s) 400. Furthermore, although the first sensor(s) 400(1), the second sensor(s) 400(2), the third sensor(s) 400(3), and the fourth sensor(s) 400(4) are shown at a particular location relative to the build module 104, the first sensor(s) 400(1), the second sensor(s) 400(2), the third sensor(s) 400(3), and/or the fourth sensor(s) 400(4) may be arranged differently relative to the build module 104 and/or one another. Furthermore, the first sensor(s) 400(1), the second sensor(s) 400(2), the third sensor(s) 400(3), and the fourth sensor(s) 400(4) are shown at a particular location relative to the build module 104 may include different sensors than shown and described. As such, it is to be understood that any number of sensor(s), and/or different types of sensor(s), may be used for measuring a quaternion of the build module 104, determining a velocity of the build module 104, and so forth.

Additionally, although FIG. 4A illustrates sensor(s) for determining the velocity, position, and/or orientation, as well as an identification, of a single build module 104 (or build modules within a single lane of the conveyor system 108). However, the 3D printing system 100 may include additional sensor(s) for other build modules disposed in other lanes of the conveyor system 108.

Figure 4B:
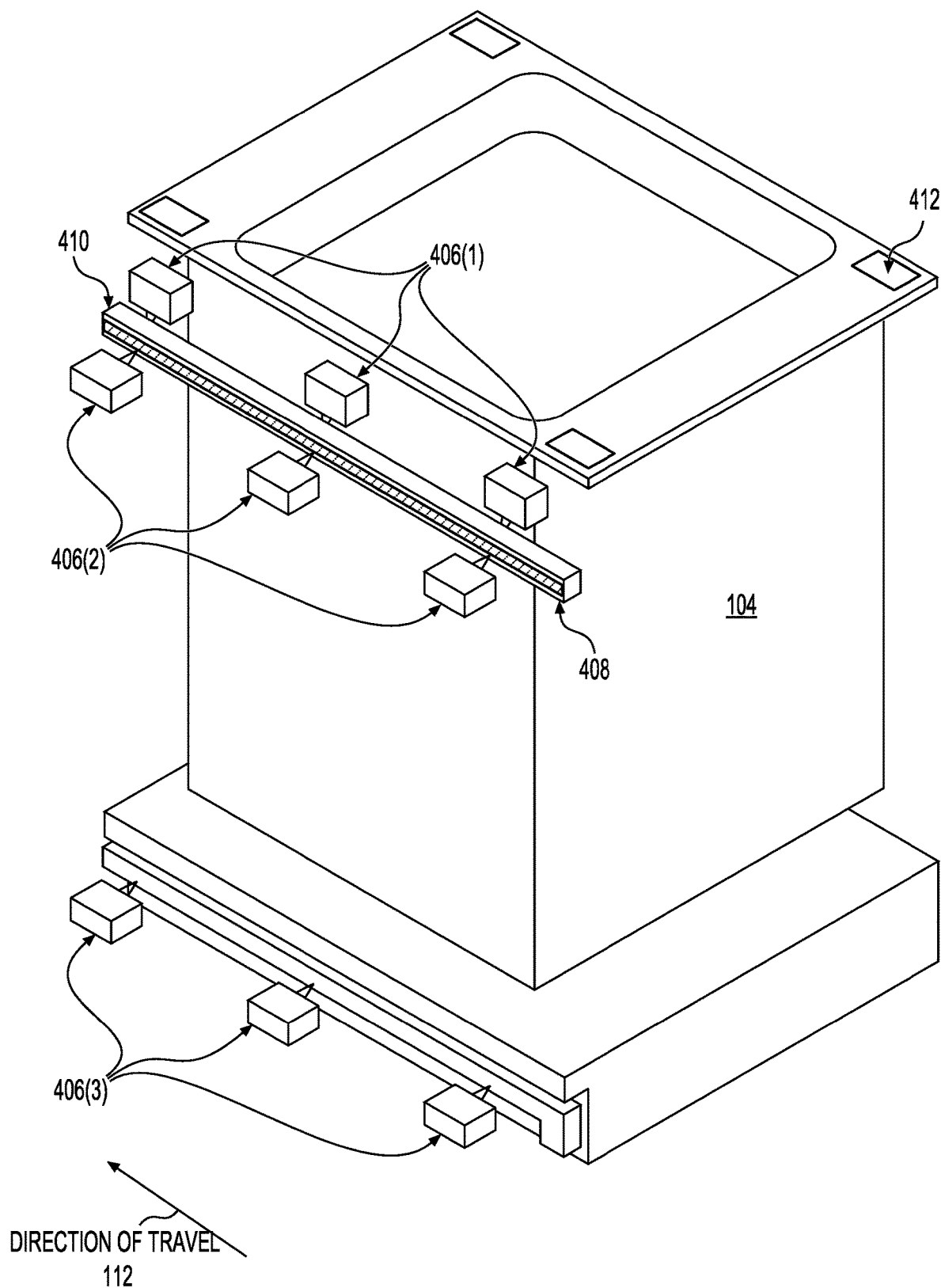
FIG. 4B illustrates example sensors that may be useable with the 3D printing system of FIG. 1, according to an example of the present disclosure.

FIG. 4B illustrates example sensors 406 of the 3D printing system 100. In some instances, the sensor(s) 406 may be in addition or alternative to the sensor(s) 400. In some instances, the sensor(s) 406 may image fiducials, encoder tape, other markers (e.g., barcodes, QR codes, etc.), on the build modules 104, or the build modules 104 themselves to account for the movement, position, and/or orientation of the build modules 104 relative to the lasing module 102. In some instances, the sensor(s) 406 may be arranged on the lasing module 102, the build module 104, the gantry 106, the conveyor system 108, frames of the 3D printing system 100, and/or other structures within an environment in which the 3D printing system 100 resides.

In some instances, some of the sensor(s) 406 may measure a velocity at which the build modules 104 pass underneath the lasing module 102, as well as a relative position and/or orientation of the build module 104 relative to the lasing module 102. Based on the movement, position, and/or orientation of the build modules 104, the laser beams may be steered to certain positions within the build areas and/or the laser beams may be focused to create certain spot sizes. Other sensor(s) may image markers or surfaces of the build modules 104 for obtaining information associated with the part(s) being manufactured within a particular build module 104. This allows the optical modules 116 (or the lasers) to be instructed (e.g., steered) for manufacturing the part(s). For example, after the markers are imaged, such image(s) may be analyzed and used to determine a progress of the part, a step in manufacturing the part, a location of the part within the build module 104, and so forth. Such information is used to control the optical modules 116 for manufacturing the part.

Turning to the sensor(s) illustrated in FIG. 4B, the sensor(s) 406 may include first sensor(s) 406(1), second sensor(s) 406(2), and/or third sensor(s) 406. In some instances, the first sensor(s) 406(1), the second sensor(s) 406(2), and/or the third sensor(s) 406(3) may represent laser range finders that are used to determine a quaternion of the build module 104 (or a point of the build module). The quaternion represents an X position, Y position, and Z position of the build module 104, as well as roll, yaw, and pitch of the build module 104.

In some instances, the first sensor(s) 406(1) are coupled to the gantry 106 and/or the lasing module 102, oriented in a direction to image a bar 410 (e.g., strut, frame, member, etc.) coupled to the build module 104. The first sensor(s) 406(1) may image the bar 410 of the build module 104 for use in determining a pitch of the build module 104. In some instances, the first sensor(s) 406(1) may image the bar 410 coupled to a particular side (or surface) of the build module 104. Using the first sensor(s) 406(1) a distance to the bar 410 may be determined. This may be used to determine a distance to a top of the build module 104. Such distances across the first sensor(s) 406(1), whether similar or different, may be compared for determining a pitch of the build module 104. Moreover, the positioning of the first sensor(s) 406(1) to image the bar 410, as compared to directly overhead of the build module 104, may permit the lasing module 102 to be placed in closer proximity to the build module 104 and/or reduce off gases and/or soot accumulating on the first sensor(s) 406(1) (which may negatively impact an ability of the first sensor(s) 406(1) to sense and/or determine a position and/or orientation of the build module 104.

The second sensor(s) 406(2) are shown disposed to the side of the build module 104. In some instances, the second sensor(s) 406(2) are coupled to the gantry 106, the lasing module 102, and/or other structures of the 3D printing system 100. Additionally, or alternatively, the second sensor(s) 406(2) may be arranged on a frame spaced vertically below a build plane of the build module 104, and angled upwards towards to image the build module 104. The second sensor(s) 406(2) may therefore be arranged to image a side (or surface) of the build module 104.

In some instances, the second sensor(s) 406(2) are arranged to image an optical tape 408 disposed along a side of the build module 104 and/or the bar 410. Imaging the optical tape 408 may be used to determine X position, Y position, and/or Z position of the build module 104. For example, the through imaging the optical tape 408, a relative position of the build module 104 to the lasing module 102 may be determined. As shown, the optical tape 408 is disposed along the side of the build module 104, in a direction associated with the direction of travel 112.

In some instances, a portion of the second sensor(s) 406(2) are used to determine a position and/or velocity of the build module 104 moving through the lasing module 102. For example, sensor data generated by the second sensor(s) 406(2) may be compared against one another to determine which of the second sensor(s) 406(2) are providing accurate information (e.g., standard deviation). For example, as the build module 104 exits the lasing module 102, some of the second sensor(s) 406(2) may no longer sense the optical tape 408. Sensor(s) that no longer report data that is consistent, or that are divergent from the other sensor(s), may be ignored.

The third sensor(s) 406(3) are shown disposed along a side of the build module 104. In some instances, the third sensor(s) 406(3) are coupled to the gantry 106, the lasing module 102, and/or other structures of the 3D printing system 100. As shown, the third sensor(s) 406(3) are arranged to image a side (or surface) of the build module 104 (or a piece of material disposed along the side of the build module 104). In some instances, the third sensor(s) 406(3) may image a surface of the build module 104 to determine a pitch and/or yaw of the build module 104. As shown, the third sensor(s) 406(3) may be arranged to image a bottom of the build module 104, or a platform on which the build module 104 resides.

In some instances, the first sensor(s) 406(1), the second sensor(s) 406(2), and/or the third sensor(s) 406(3) may represent laser range finders. In such instances, the first sensor(s) 406(1), the second sensor(s) 406(2), and/or the third sensor(s) 406(3) may output projections and receive reflections associated with the projections. The reflections are used to triangulate a position and/or orientation of the build module 104.

In some instances, the 3D printing system 100 may include additional sensor(s), such as cameras, that are arranged to image the marker(s) 412 disposed along the top of the build module 104. In some instances, the cameras may be coupled to the lasing module 102 and directed vertically downward for imaging the marker(s) 412. As shown, the marker(s) 412 may be located at corners of the build module 104 and are used to track the build module 104 throughout the environment. The marker(s) 412, however, may be located elsewhere on the build module (e.g., side). The marker(s) 412 are used to identify the build module 104, specifies of the build module 104 (e.g., size, material, etc.), a part being manufactured within the build module 104, and/or a localization of the build module 104 relative to the lasing module.

In some instances, the second sensor(s) 406(2) may have a sampling rate greater than approximately 300 kHz. The first sensor(s) 406(1) and/or the third sensor(s) 406(3) may have a sampling rate greater than 1 kHz. In some instances, the second sensor(s) 406(2) may have a latency of less than approximately 3 microseconds, whereas the first sensor(s) 406(1), the third sensor(s) 406(3) may have a latency of less than approximately 1 millisecond.

In some instances, the 3D printing system 100 may include more than or less than the number of sensor(s) 406 shown in FIG. 4B for imaging the marker(s) 412, the optical tape 408, the build module 104, and/or other components of the 3D printing system 100. The number of sensor(s) 406, for example, may be based at least in part on a size of the build module 104 and/or a field of view of the laser(s) within the optical modules 116. The frames or components to which the sensor(s) 406 couple may be manufactured from heat resistant materials to reduce expansion when heated. An example material may include, for example, invar. Additionally, the sensor(s) 406 may be shielding via shielding plates or may be cooled to prevent heat affecting a reading of the sensor(s) 406. Furthermore, although the first sensor(s) 406(1), the second sensor(s) 406(2), and the third sensor(s) 406(3) are shown at a particular location relative to the build module 104, the first sensor(s) 406(1), the second sensor(s) 406(2), and/or the third sensor(s) 406(3) may be arranged differently relative to the build module 104 and/or one another. Furthermore, although the first sensor(s) 406 (1), the second sensor(s) 406(2), and the third sensor(s) 406(3) are shown at a particular location relative to the build module 104, the build module 104 and/or the 3D printing system 100 may include different sensors than shown and described. As such, it is to be understood that any number of sensor(s), and/or different types of sensor(s), may be used for measuring a quaternion of the build module 104, determining a velocity of the build module 104, and so forth.

Additionally, although FIG. 4B illustrates sensor(s) for determining the velocity, position, and/or orientation, as well as an identification, of a single build module 104 (or build modules within a single lane of the conveyor system 108). However, the 3D printing system 100 may include additional sensor(s) for other build modules disposed in other lanes of the conveyor system 108.

Figure 5A:
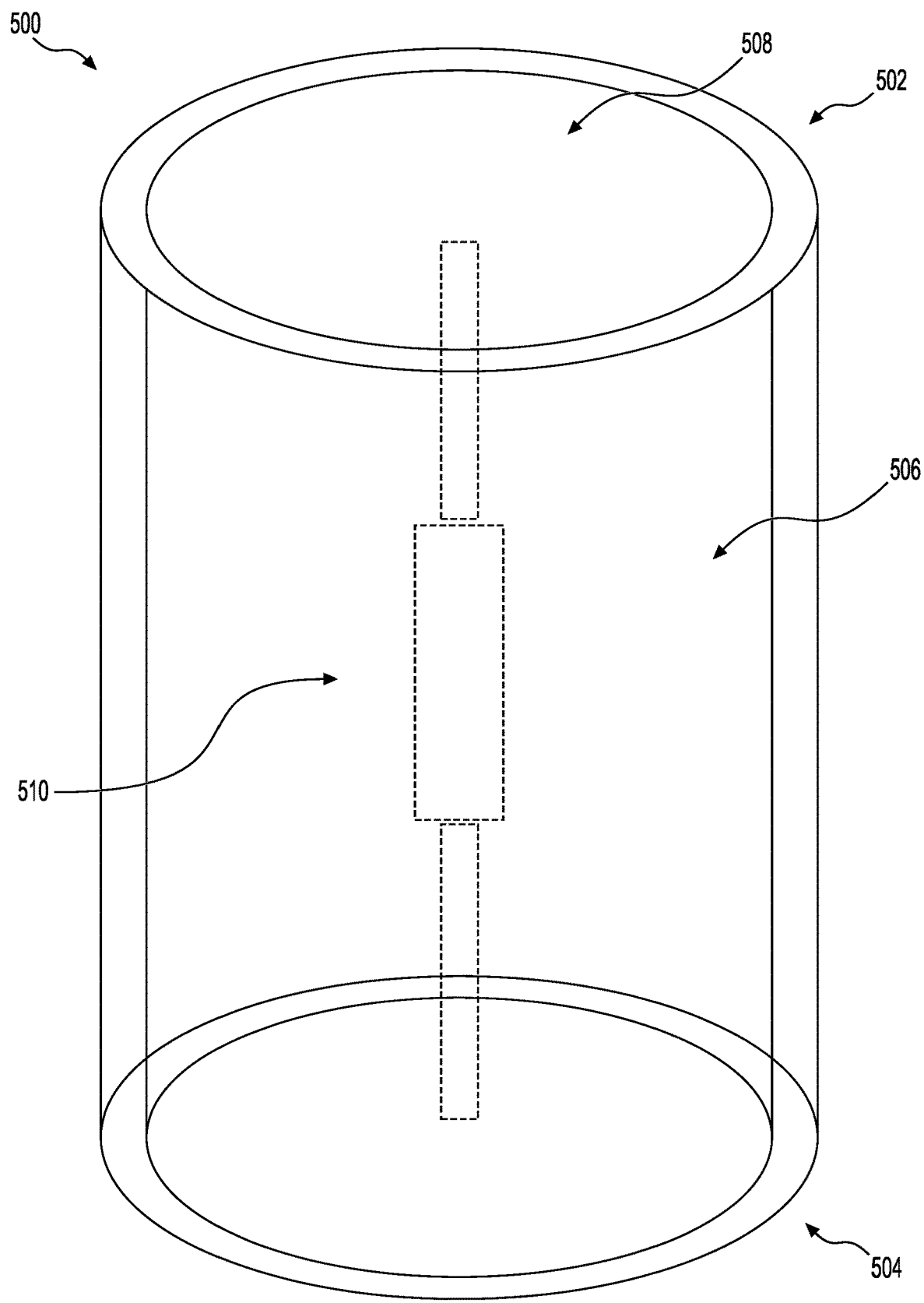
FIG. 5A illustrates an example build module of the 3D printing system of FIG. 1, according to an example of the present disclosure.

FIG. 5A illustrates an example build module 500, which may be representative of any of the build modules 104(1)-(5). The build module 500 includes a top 502 and a bottom 504, and an interior cavity 506 that spans between the top 502 and the bottom 504. The bottom 504 includes components for operably coupling to the conveyor system 108 for traversing along the conveyor system 108 and/or self-propelled build modules. For example, the bottom 504 may include alignment mechanisms for aligning the build module 500 on the conveyor system 108, and/or attachment mechanism for coupling the build module 500 to the conveyor system 108. In some instances, the build module 500 may include kinematic mounts for precise placement and orientation of the build module 500 on the conveyor system 108. The top 502, meanwhile, may be provided vertically beneath the lasing module 102 and fit within the processing chamber such that laser beams are directed to a build area of the build module 500.

The build module 500 includes a build plate 508 onto which powdered metal is placed. In some instances, the build plate 508 may correspond to the build area on which parts are manufactured. For example, powdered metal may be deposited onto the build plate 508, and the optical modules 116 may emit laser beams towards the build plate 508. A piston 510 operably couples to the build plate 508 for lowering the build plate 508 into the interior cavity 506, in a direction towards the bottom 504. That is, as parts are manufactured within the build module 500, the build plate 508 may lower into the interior cavity 506 such that additional layers of the powdered metal may be deposited onto the build plates 508 and previous layers deposited (e.g., via the recoater 118). Upon completion of the part, the build plate 508 may be raised and the part may be removed from the build module 500. Actuators other than the piston 510 may be used to raise and lower the build plate 508 (e.g., linear actuators, screw drives, telescoping systems, etc.). Additionally, although the build plate 508 is shown being circular in shape, the build plate 508 may be rectangular, square, hexagonal, and/or other shapes.

The build module 500, in some instances, may be manufactured by coupling (e.g., welding, fasteners, etc.) one or more bodies together. For example, the build module 500 may be manufactured by coupling two sections (e.g., cylindrical sections) together. In some instances, the build module 500 may include mechanisms for dispersing heat generated during use (e.g., cooling conduits, heatsink(s), etc.). For example, as the laser emits laser beams, heat is generated and the mechanism(s) may assist in dissipating generated heat.

Figure 5B:
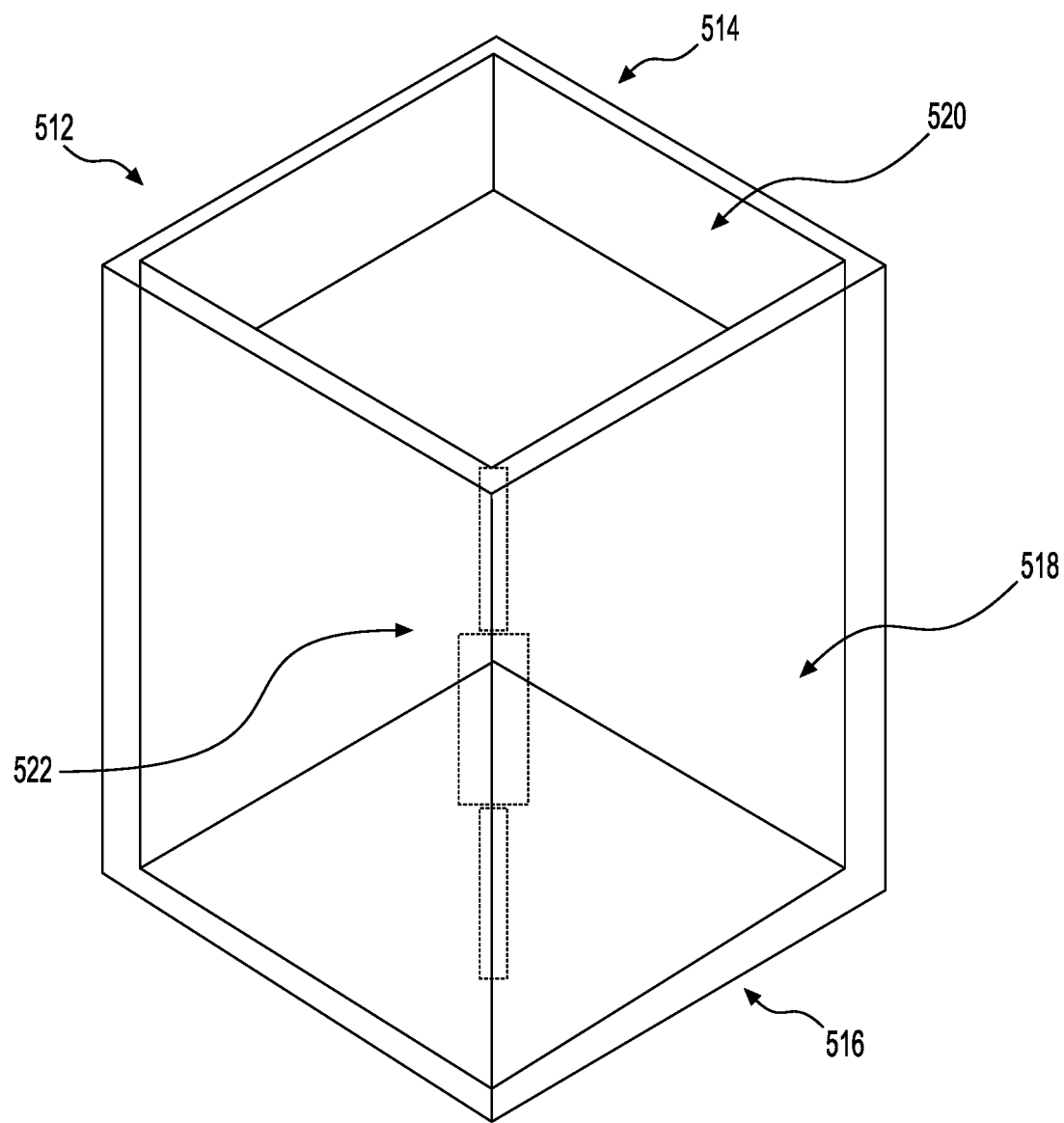
FIG. 5B illustrates an example build module of the 3D printing system of FIG. 1, according to an example of the present disclosure.

FIG. 5B illustrates an example build module 512, which may be representative of any of the build modules 104(1)-(5). Compared to the build module 500, the build module 512 is shown being square shaped. The build module 512 includes a top 514 and a bottom 516, and an interior cavity 518 that spans between the top 514 and the bottom 516. The bottom 516 includes components for operably coupling to the conveyor system 108 for traversing along the conveyor system 108 and/or self-propelled build modules. For example, the bottom 516 may include alignment mechanisms for aligning the build module 512 on the conveyor system 108, and/or attachment mechanism for coupling the build module 512 to the conveyor system 108. In some instances, the build module 512 may include kinematic mounts for precise placement and orientation of the build module 512 on the conveyor system 108. The top 514, meanwhile, may be provided vertically beneath the lasing module 102 and fit within the processing chamber such that laser beams are directed to a build area of the build module 512.

The build module 512 includes a build plate 520 onto which powdered metal is placed. In some instances, the build plate 520 may correspond to the build area on which parts are manufactured. For example, powdered metal may be deposited onto the build plate 520, and the optical modules 116 may emit laser beams towards the powdered metal on the build plate 520. A piston 522 operably couples to the build plate 520 for lowering the build plate 520 into the interior cavity 518, in a direction towards the bottom 516. That is, as parts are manufactured within the build module 512, the build plate 520 may lower into the interior cavity 518 such that additional layers of the powdered metal may be deposited onto the build plate 520 and previous layers deposited. Upon completion of the part, the build plate 520 may be raised and the part may be removed from the build module 512. Actuators other than the piston 522 may be used to raise and lower the build plate 520 (e.g., linear actuators, screw drives, telescoping systems, etc.). Additionally, although the build plate 520 is shown being square in shape, the build plate 520 may be rectangular, circular, hexagonal, and/or other shapes.

The build module 512, in some instances, may be manufactured by coupling (e.g., welding, fasteners, etc.) one or more bodies together. For example, the build module 512 may be manufactured by coupling two sections (e.g., cylindrical sections) together. In some instances, the build module 512 may include mechanisms for dispersing heat generated during use (e.g., cooling conduits, heatsink(s), etc.). For example, as the laser emits laser beams, heat is generated and the mechanism(s) may assist in dissipating generated heat.

Figure 6:
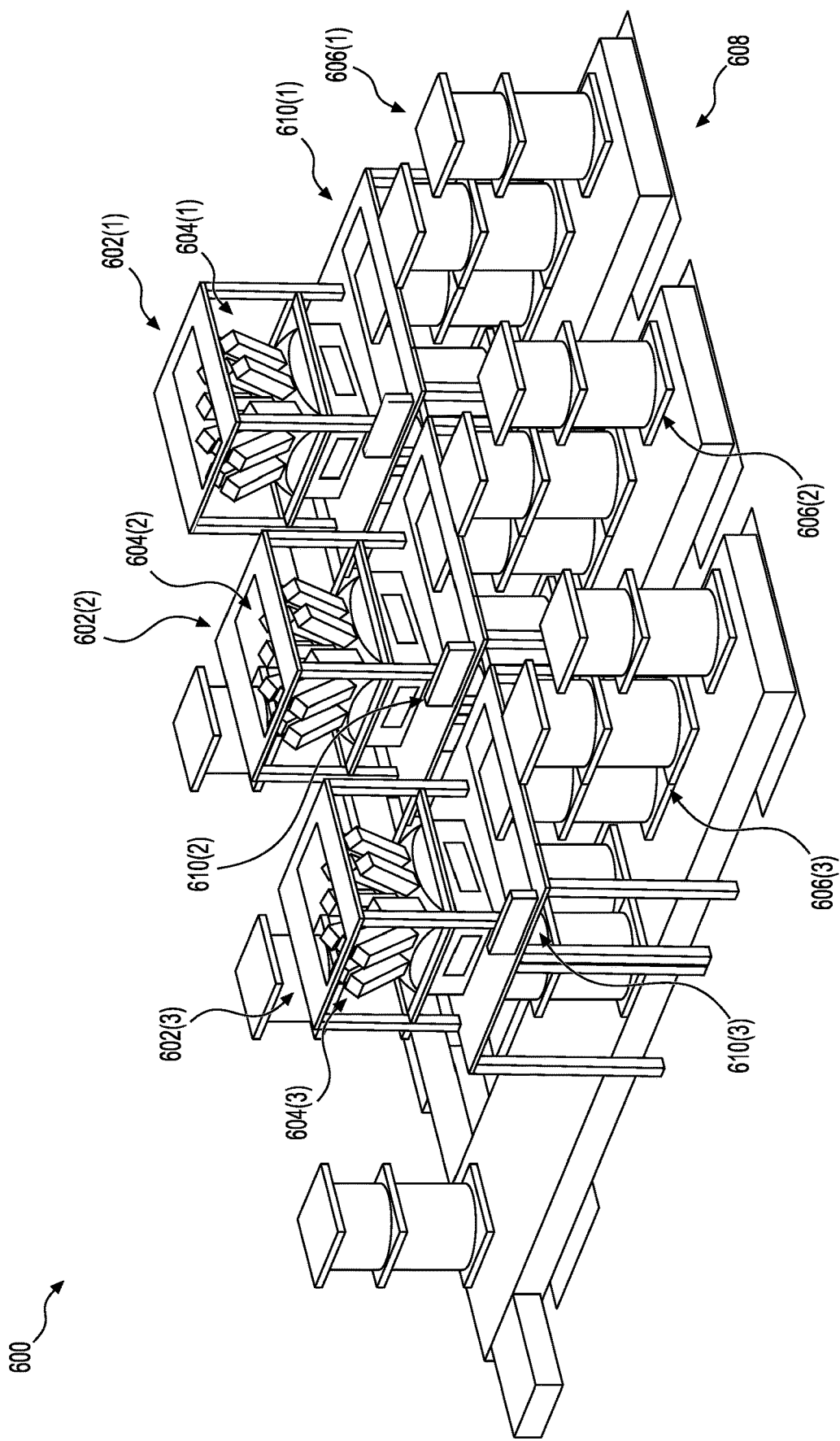
FIG. 6 illustrates an example environment including a plurality of 3D printing systems, according to an example of the present disclosure.

FIG. 6 illustrates an example environment 600 including a plurality of 3D printing systems, such as a first 3D printing system 602(1), a second 3D printing system 602(2), and a third 3D printing system 602(3). However, the environment 600 may include any number of 3D printing systems.

The first 3D printing system 602(1), the second 3D printing system 602(2), and the third 3D printing system 602(3) may be similar to the 3D printing system 100 as described above. For example, each of the 3D printing system 602(1)-(3) may include respectively lasing modules 604(1)-(3) configured to direct laser beams onto build modules 606(1)-(3). The lasing modules 604(1)-(3) may include any number of optical modules for generating the laser beams. As shown, the build modules 606(1)-(3) are arranged in multiple lanes that direct the build modules 606(1)-(3) to the lasing modules 604(1)-(3), respectively. In some instances, two lanes may supply the respective build modules 606(1)-(3) to the lasing modules 604(1)-(3). The lasing modules 604(1)-(3) may therefore be configured to steer laser beam(s) to across build modules 606(1)-(3) conveyed along the lanes.

In some instances, the environment 600 includes a conveyor system 608, which may include similar components as the conveyor system 108. The conveyor system 608 may represent a central conveyor system that conveys the build modules 606(1)-(3) across the lasing modules 604(1)-(3). For example, the conveyor system 608 may be capable of transporting the build modules 606(1)-(3) between the lasing modules 604(1)-(3). As such, the build modules 606(1)-(3) may not be associated with respective lasing modules 604(1)-(3), but may be configured to pass between the lasing modules 604(1)-(3) for manufacturing parts. To permit the transfer of the build modules 606(1)-(3) across the lasing modules 604(1)-(3), the conveyor system 608 may include track shifters (e.g., gripping mechanism) and/or motors of the conveyor system 608 may be selectively activated for controlling a movement of the build modules 606(1)-(3). The conveyor system 608 may also include rotators for changing an orientation of the build modules 606(1)-(3). However, in some instances, the environment 600 may include individual conveyor systems that convey the build modules 606(1)-(3) to the lasing modules 604(1)-(3), respectively.

Additionally, or alternatively, rather than the conveyor system 608 transporting the build modules 606(1)-(3), the build modules 606(1)-(3) may be self-propelled. For example, the build modules 606(1)-(3) may include components for orienting and transporting the build modules about the environment 600. Motor(s) may maneuver the build modules 606(1)-(3) through the lasing modules 604(1)-(3) as parts are being manufactured, across the lasing modules 604(1)-(3), and so forth. In some instances, the build modules 606(1)-(3) may maneuver about the environment 600 on a system of tracks, rails, and so forth, or may freely maneuver about a floor. In some instances, the build modules 606(1)-(3) may include sensors for imaging fiducials in order to properly maneuver the build modules 606(1)-(3) about the environment 600. The build modules 606(1)-(3) may also communicatively couple to one or more computing devices for being instructed as to where to travel within the environment 600. Additionally, the build modules 606(1)-(3) may include actuators that are capable of tilting, or otherwise orienting the build modules 606(1)-(3) relative to the lasing modules 604(1)-(3). In some instances, the lasing modules 604(1)-(3) and the build modules 606(1)-(3) may be in communication with one another. For example, the lasing modules 604(1)-(3) and the build modules 606(1)-(3) may include network interfaces that enable communication over one or more network(s) (e.g., Bluetooth, Zigbee, Wi-Fi, etc.). The build modules 606(1)-(3) may transmit information associated with a location of the build modules 606(1)-(3) to the lasing modules 604(1)-(3) for use in steering the laser beams towards areas within the build modules 606(1)-(3). The build modules 606(1)-(3) may also receive instructions as to places within the environment 600 in which the building modules 606(1)-(3) are to travel.

In some instances, each of the lasing modules 604(1)-(3) may be associated with a respective recoater 610(1)-(3) that applies coats of powdered metal to the build modules 606(1)-(3), respectively. In some instances, the environment 600 may include additional components not shown. For example, more than one lasing module may be disposed in each lane, such as two or three back to back lasing modules. The recoaters 610(1)-(3) may also be located elsewhere than shown. More than one recoater may be associated with the lasing modules 604(1)-(3). Additionally, sensor(s) may be disposed about the environment 600 for tracking a location of the build modules 606(1)-(3).

In some instances, each of the recoaters 610(1)-(3) may include or be associated with sensor(s) that measure a distance to the powdered metal, a distance to or shape of the part being manufactured, and/or depth of the powdered metal. For example, laser line scanner(s) may be used to determine a shape of the part being manufactured. This may be used to adjust an amount of powdered metal deposited (e.g., thickness) within the build modules 606(1)-(3) by the recoaters 610(1)-(3), respectively. Furthermore, in some instances, the laser line scanner(s) may measure a thermal expansion and contraction of the part being manufactured. Such feedback may additionally or alternatively be used to control the amount of powdered metal deposited into the build modules 606(1)-(3).

Figure 7:
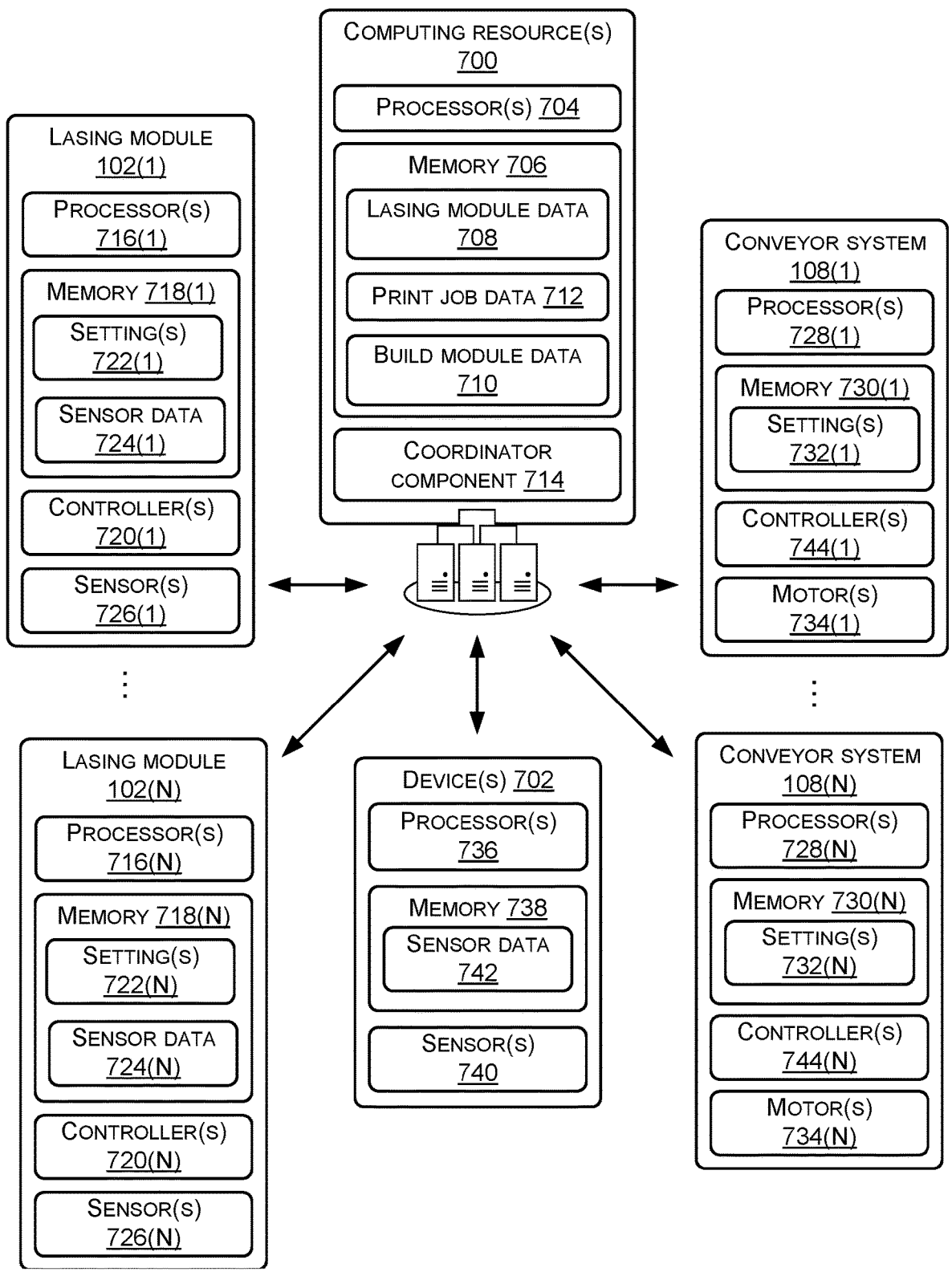
FIG. 7 illustrates example computing components for manufacturing parts using the 3D printing system of FIG. 1, according to an example of the present disclosure.

FIG. 7 illustrates example components for controlling an operation of a 3D printing system, such as the 3D printing system 100. Computing resource(s) 700 are shown being in communication with lasing modules 102(1)-(N), such as a first lasing module 102(1) and up to nth lasing modules 102(N), conveyor systems 108(1)-(N), such as a first conveyor system 108(1) and up to nth conveyor system 108(N), and device(s) 702. As discussed herein, the computing resource(s) 700 communicatively couple to the lasing modules 102(1)-(N), the conveyor systems 108(1)-(N), and the device(s) 702 for at least partially controlling an operation of the 3D printing system 100.

In some instances, the lasing modules 102(1)-(N) may be similar to and/or represent the lasing modules 102 as discussed above. For example, each of the lasing modules 102(1)-(N) may include multiple optical modules 116 having multiple lasers, sensor(s), mirror(s), lens(es), and so forth. The conveyor systems 108(1)-(N) may be similar to and/or represent the conveyor systems 108(1)-(N) as discussed above and include motor(s), roller(s), belt(s), etc. for conveying the build modules 104 into the lasing modules 102(1)-(N), respectively.

In some instances, the computing resource(s) 700 may be a component of the 3D printing system 100, or may a component remote from the 3D printing system 100. The computing resource(s) 700 are shown including processor(s) 704 and memory 706, where the processor(s) 704 may perform various functions and operations associated with controlling the 3D printing system 100 and the memory 706 may store instructions executable by the processor(s) 704 to perform the operations described herein. The computing resource(s) 700 may be in communication with the lasing modules 102(1)-(N), the conveyor systems 108(1)-(N), and the device(s) 702 via wired (e.g., ethernet, USB, fiber optic, serial, etc.) or wireless (e.g., radio frequency, Bluetooth, Wi-Fi, cellular, etc.) technologies. However, the computing resource(s) 700 may communicatively couple to other components, or devices, not shown. For example, the computing resource(s) 700 may be communicatively coupled to recoaters that apply coats of powdered material to build plates of the build modules 104, respectively.

The memory 706 is shown storing or having access to lasing module data 708, build module data 710, and print job data 712. The lasing module data 708 may include identifiers or information associated with the lasing modules 102(1)-(N). Such information may be used when communicating with the individual lasing modules 102(1)-(N). In some instances, the lasing modules 102(1)-(N) may represent lasing modules of a single 3D printing system, or may represent lasing modules across one or more 3D printing systems (e.g., as discussed above in FIG. 6). For example, an environment may include a plurality of lasing modules 102(1)-(N) manufacturing parts, and the lasing module data 708 may be utilized when communicating with the individual lasing modules 102(1)-(N) for manufacturing parts, respectively. In some instances, the lasing module data 708 further includes characteristics of the optical modules 116 associated with the lasing module 102(1)-(N), such as laser beam power, usage (e.g., availability), location, spot size, steering location, lens(es) and/or mirror(s) orientation, and so forth. Such information may be used for knowing a state of the lasing modules 102(1)-(N).

The build module data 710 may include information associated with the build modules 104, such as a location of the build modules 104 within an environment, a part being manufactured within the build module 104, a type of powdered material in the build module 104, a size of the build module 104 (or a container thereof), a thickness of the build plate 508, and so forth. In some instances, the build module data 710 may be generated by sensor(s) disposed about the environment, the lasing modules 102(1)-(N), the build modules 104 themselves, and/or the conveyor systems 108(1)-(N) for tracking the location of the build modules 104. The location of the build module 104 may be tracked throughout an environment as the build modules 104 traverse the conveyor systems 108(1)-(N). Such information may be utilized when instructing the lasing modules 102(1)-(N) (and the optical module(s) 116 to manufacture certain parts), and/or the conveyor systems 108(1)-(N) to transport the build modules 104 to certain locations or the lasing modules 102(1)-(N) within the environment. Additionally, such information may be utilized for altering components of the lasing modules 102(1)-(N), such as the mirror(s) and/or lens(es) within the optical modules 116, for steering the laser beams and/or focusing the laser beams of the optical modules 116, respectively. Altering the component(s) of the lasing modules 102(1)-(N) in this manner accounts for shifts in the build modules 104 as the build modules 104 traverse the environment and along the conveyor system 108, between lasing modules 102(1)-(N), and so forth. As such, parts may be accurately and precisely manufactured.

The print job data 712 may correspond to parts that are to be built within the build modules 104. For example, the print job data 712 may indicate sides, surfaces, lasers, features, and so forth that make up or form the part. The print job data 712 may be used in conjunction with the lasing module data 708 and the build module data 710 for manufacturing the parts. For example, the lasing modules 102(1)-(N) may be instructed to manufacture parts queued in the print job data 712.

In some instances, the computing resource(s) 700 include a coordinator component 714 for controlling or instructing the lasing modules 102(1)-(N), the conveyor systems 108 (1)-(N), and/or the device(s) 702. For example, depending on a part to be manufactured, or a particular portion of the part, the coordinator component 714 may transmit instructions to the lasing modules 102(1)-(N), respectively, for steering mirror(s) towards a particular location on the build area. Additionally, or alternatively, the coordinator component 714 may also control an amount of power emitted by laser(s) of the lasing modules 102(1)-(N) and/or a focal point of lens(es) of the optical modules 116. Such control may change a spot size associated with the laser beams emitted by the optical modules 116 of the lasing modules 102(1)-(N), respectively. Moreover, the coordinator component 714 may instruct the conveyor systems 108(1)-(N) to transport the build modules 104 to certain locations within the environment, at certain speeds, to certain lasing modules 102(1)-(N), as so forth for manufacturing the parts.

The coordinator component 714 may utilize the lasing module data 708, the build module data 710, and/or the print job data 712 for use in directing the lasing modules 102(1)-(N) when manufacturing parts. The coordinator component 714 may also be in communication with the lasing modules 102(1)-(N) for knowing whether and when the lasing modules 102(1)-(N) (or components thereof) are malfunctioning or otherwise non-operational. Such status may be used when scheduling the lasing modules 102(1)-(N) for repair or replacement, or for redirecting other lasing modules 102(1)-(N) to manufacture parts assigned to the non-operational lasing modules 102(1)-(N).

In some instances, the lasing modules 102(1)-(N) themselves may include controller(s), switches, and the like that are responsive to instructions transmitted by the coordinator component 714. For example, each of the lasing modules 102(1)-(N) may include processor(s) and memory. The first lasing module 102(1) is shown including first processor(s) 716(1) and first memory 718(1) and the nth lasing module 102(N) is shown including nth processor(s) 716(N) and nth memory 718(N). The processor(s) 716(1)-(N) may perform various functions and operations associated with controlling the laser(s), imaging sensor(s), mirror(s), lens(es), etc. of lasing modules 102(1)-(N), respectively, and the memory 718(1)-(N) may store instructions executable by the processor(s) 716(1)-(N) to perform the operations described herein. For example, the processor(s) 716(1)-(N) may receive instructions from the computing resource(s) 700 associated with manufacturing parts, and the processor(s) 716(1)-(N) may control components of the lasing modules 102(1)-(N), respectively, to carry out those instructions. Such instructions may include where to steer laser beams emitted by lasers of the optical modules 116 to certain locations within the build modules 104, respectively.

In some instances, the lasing modules 102(1)-(N) may include controllers that cause the lasing modules 102(1)-(N) to control the laser(s), imaging sensor(s), mirror(s), lens(es), etc. of the lasing modules 102(1)-(N). For example, the first lasing module 102(1) may include a first controller 720(1) and the nth lasing module 102(N) may include an nth controller 720(N). Each of the controllers 720(1)-(N) is responsive to instructions from the computing resource(s) 700, such as the coordinator component 714, or may be independently operable to cause the lasing modules 102(1)-(N) to perform certain operations. In some instances, for example, the controllers 720(1)-(N) may actuate galvo mirrors of the optical modules 116 based on a receiving instructions as to a melting location within the build area of the build modules 104.

The memory 718(1)-(N) may also respectively store the setting(s) 722(1)-(N) that correspond to parameters of the lasing modules 102(1)-(N). For example, the setting(s) 722 (1)-(N) may include beam powers, steering directions, beam path length, and so forth. The controllers 720(1)-(N) may respectively utilize the setting(s) 722(1)-(N) for controlling an operation of the lasing modules 102(1)-(N).

The memory 718(1)-(N) is further shown respectively storing sensor data 724(1)-(N) that corresponds to data generated by respective sensor(s) 726(1)-(N) (e.g., the sensor(s) 400 and/or the sensor(s) 406) of the lasing modules 102(1)-(N) or the environment of the lasing modules 102 (1)-(N). In some instances, the sensor(s) 726(1)-(N) may include imaging sensor(s), such as cameras, laser range finders that image (e.g., sense) the build modules 104, laser displacement sensor(s) that image (e.g., sense) the build modules 104, optical encoder(s) (e.g., linear optical encoder(s)), computer vision sensor(s), and so forth. For example, as the build modules 104 are transported on the conveyor systems 108(1)-(N), respectively, the sensor(s) 726(1)-(N) may image the build modules 104. The sensor data 724(1)-(N) is utilized for determining a velocity, position, distance to, and/or orientation of the build modules 104 relative to the lasing modules 102(1)-(N), respectively, for use in controlling the lasing modules 102(1)-(N). For example, depending on the position of the build modules 104, the mirror(s) and/or lens(es) may be controlled to adjust a steering or spot size of the laser beams. Such adjustments ensure the accurate and precise manufacturing of parts. In some instances, the sensor data 724(1)-(N) may be provided to the computing resource(s) 700, such as the coordinator component 714, for providing instructions back to the lasing modules 102(1)-(N) to control an operation thereof. Additionally or alternatively, the controller(s) 720(1)-(N) may utilize the sensor data 724(1)-(N) for making adjustments to the lasing modules 102(1)-(N), respectively (e.g., mirror(s) and lens(es)).

The conveyor systems 108(1)-(N) are shown including respective processor(s) 728(1)-(N) and memory 730(1)-(N), where the processor(s) 728(1)-(N) may perform various functions and operations associated with controlling conveyor system 108(1)-(N) and the memory 730(1)-(N) may store instructions executable by the processor(s) 728(1)-(N) to perform the operations described herein. The memory 730(1)-(N) is shown respectively storing setting(s) 732(1)-(N) associated with an operation of the conveyor systems 108(1)-(N). For example, the setting(s) 732(1)-(N) may include a speed of motors, rotators, and so forth of the conveyor systems 108(1)-(N). Such information may be used to control respective motor(s) 734(1)-(N) of the conveyor systems 108(1)-(N) for directing the build modules 104 about an environment and/or to certain lasing modules 102(1)-(N) in the environment. In some instances, the coordinator component 714 may instruct the conveyor systems 108(1)-(N) as to how to transport the build modules 104 about the environment (e.g., speed, location, etc.). Moreover, the conveyor systems 108(1)-(N) may respectively include controller(s) 744(1)-(N) that are responsive to the instructions, and which carry out operation of the conveyor systems 108(1)-(N).

The device(s) 702 are shown including processor(s) 736 and memory 738, where the processor(s) 736 may perform various functions and operations and the memory 738 may store instructions executable by the processor(s) 736 to perform the operations described herein. The device(s) 702 may include sensor(s) 740, which may be similar to the sensor(s) 726(1)-(N) described above. For example, the sensor(s) 740 may detect positions, locations, orientations, or an operational status of the build modules 104 and/or the conveyor system 108(1)-(N). In some instances, the device(s) 702 may be disposed about the environment, on frames of the lasing modules 102(1)-(N), the conveyor systems 108(1)-(N), the build modules 104, and so forth. The sensor(s) 740 of the device(s) 702 generate sensor data 742 that may be used for at least partially controlling an operation of the 3D printing system 100. For example, the sensor data 742 may be used to determine an operation of the build modules 104 and/or a location of the build modules 104 about the environment. In some instances, the sensor data 742 may be transmitted to the computing resource(s) 700, the lasing modules 102(1)-(N), and/or the conveyor systems 108(1)-(N) for at least partially controlling an operation thereof.

Although not shown, the build modules 104 may include similar components. For example, the build modules 104 may include processors, memory, controllers, sensors, and so forth for maneuvering about the environment, collecting data associated with the environment, collecting data associated with the a position, orientation, location, and so forth of the build modules. In such instances, the lasing modules 102(1)-(N) and the computing resources 700, as well as other components, may communicatively couple to the build modules 104.

In some instances, the computing resource(s) 700 may be implemented as one or more servers and may, in some instances, form a portion of a network-accessible computing platform implemented as a computing infrastructure of processors, storage, software, data access, etc. that is maintained and accessible via a network such as the Internet. The computing resource(s) 700 does not require end-user knowledge of the physical location and configuration of the system that delivers the services. Common expressions associated for the computing resource(s) 700 include "on-demand computing", "software as a service (SaaS)", "platform computing", "network-accessible platform", "cloud services", "data centers", etc. However, the computing resource(s) 700 may be located within a same environment as the 3D printing system 100.

As used herein, a processor, such as the processor(s) 704, 716(1)-(N), 728(1)-(N), and/or 736 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein may be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 706, 718(1)-(N), 730(1)-(N), and/or 738 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which may be used to store the desired information and which may be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which may be used to store the desired information and which may be accessed by the processor(s).

Figure 8:
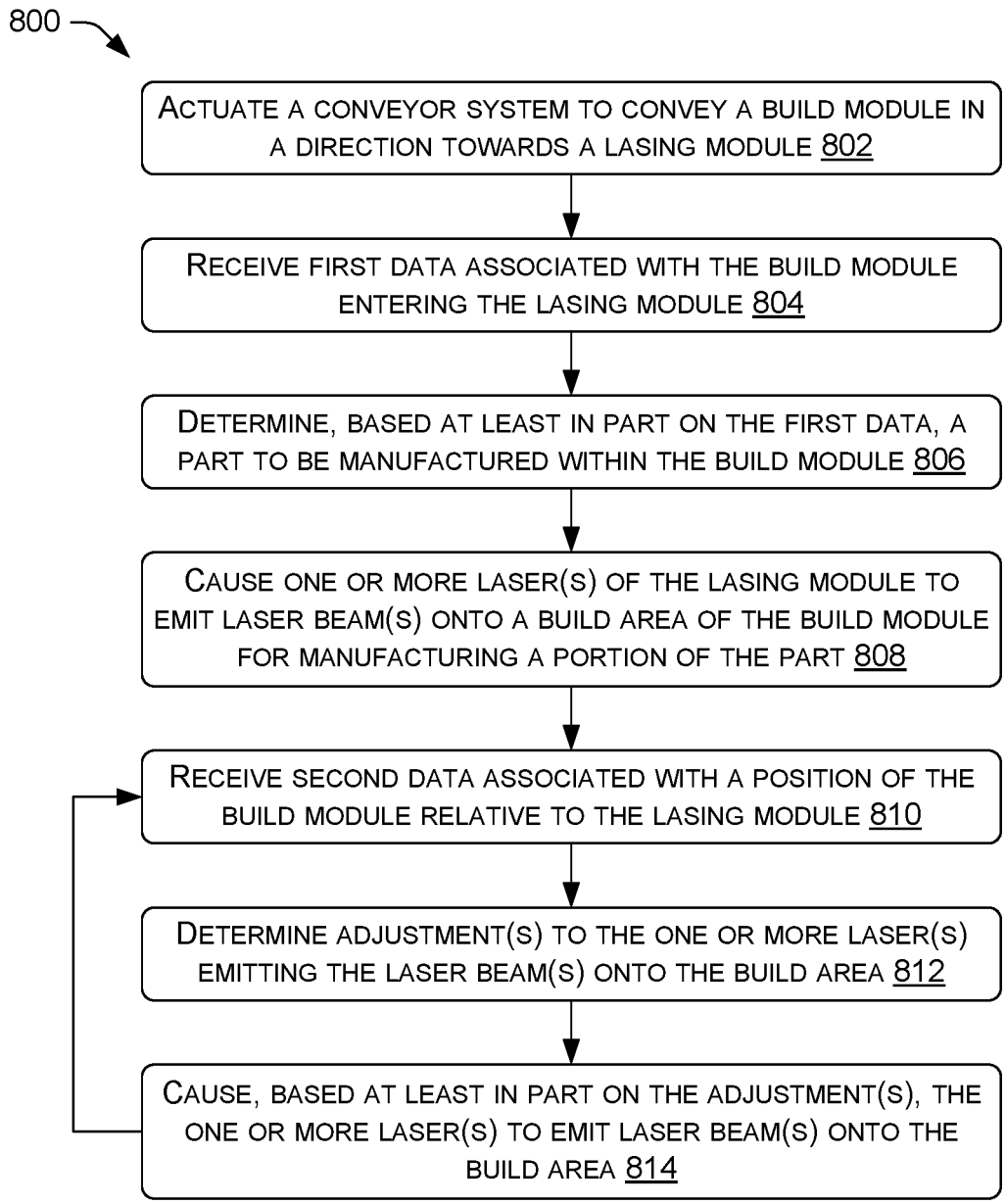
FIG. 8 illustrates an example process for manufacturing parts using the 3D printing system of FIG. 1, according to an example of the present disclosure.

FIGS. 7 and 8 illustrate various processes related to manufacturing parts using the 3D printing system 100. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-7, although the processes may be implemented in a wide variety of other environments, architectures and systems.

FIG. 8 illustrates an example process 800 for manufacturing parts using the 3D printing system 100. In some instances, the process 800 may be performed by the 3D printing system 100, or components thereof.

At 802, the process 800 may include actuating a conveyor system to convey a build module in a direction towards a lasing module. For example, the computing resource(s) 700 may transmit an instruction to the conveyor system 108, and in response, motors for of the conveyor system 108 may actuate for conveying the build module 104 towards the lasing module 102. The build module 104 includes the build area on which powdered metal is disposed for manufacturing parts.

At 804, the process 800 may include receiving first data associated with the build module entering the lasing module. For example, the computing resource(s) 700 may receive sensor data generated by sensor(s) of the lasing module 102, the conveyor system 108, or other devices disposed about an environment in which the 3D printing system 100 resides. In some instances, the sensor data received at 804 may correspond to image data of marker(s) (e.g., QR codes) on the build module 104. As such, when the marker(s) come into view of the sensor(s), the sensor(s) may generate the sensor data.

At 806, the process 800 may include determining, based at least in part on the first data, a part to manufactured within the build module. For example, the computing resource(s) 700 may process the sensor data to determine a part being manufactured within the build module 104. In some instances, the computing resource(s) 700 may access the print job data 712 for knowing the part being manufactured in the build module 104. That is, based on imaging the marker(s) on the build module 104, such information may be used for determining the part being manufactured or a progress of the part being manufactured.

At 808, the process 800 may include causing one or more laser(s) of the lasing module to emit laser beam(s) onto a build area of the build module for manufacturing a portion of the part. For example, the computing resource(s) 700, such as the coordinator component 714, may transmit instructions to the lasing module 102 for controlling an operation of the optical modules 116. Such control may include actuating mirror(s) and/or lens(es) of the optical modules 116, respectively, to adjust a steering of the laser beam(s) and/or a spot size of the laser beam(s). That is, after determining the part to be manufactured in the build module 104, the lasers of the lasing module 102 are instructed to melt portions of the powdered metal within the build area for manufacturing a portion of the part. Additionally, the portion of the part may be manufactured while the conveyor system 108 is conveying the build module 104 (e.g. while the build module 104 is moving).

At 810, the process 800 may include receiving second data associated with a position of the build module relative to the lasing module. For example, the computing resource(s) 700 may receive sensor data associated with the position of the build module 104. The sensor data may be generated by sensor(s) of the lasing module 102, the conveyor system 108, and/or other device(s) disposed about the environment of the 3D printing system 100. In some instances, the sensor data may be used to determine a full quaternion of the build module 104 (e.g., X position, Y position, Z position, roll, pitch, and yaw). The sensors that generate the sensor data may be arranged to image multiple side(s) and/or surface(s) of the build module 104, such as the top and/or sides, for determining the quaternion. Moreover, in some instances, the sensor(s) may be arranged to image fiducials on the build module 104, such as the optical tape 402, for knowing the quaternion or for otherwise determining the position of the build module 104. In some instances, the position of the build module 104 may be determined prior to manufacturing the part.

At 812, the process 800 may include determining adjustment(s) to the one or more laser(s) emitting the laser beam(s) onto the build area. For example, using the second data and determining the position of the build module 104, the computing resource(s) 700 may determine the adjustment(s) such that the part is manufactured accurately. As an example, the build module 104 may become shifted during transport on the conveyor system 108, and the adjustment(s) may serve to correct such shifts. Here, the computing resource(s) 700 may determine how to steer the laser beam(s) and/or how to focus the laser beam(s) to accurately manufacture the part. In some instances, the lasing module 102 itself may determine how to adjust the laser beam(s).

At 814, the process 800 may include causing, based at least in part on the adjustment(s), the one or more laser(s) to emit laser beam(s) onto the build area. For example, the adjustment(s) may be implemented by the lasing module 102 to actuate the mirror(s) such that the laser beam(s) are steered to correct locations on the build area. Additionally or alternatively, the lens(es) may be adjusted to alter a focal length of the laser beam(s). Causing performance of the adjustment(s) therefore accounts for a position of the build module 104 relative to the lasing module 102 given the movement of the build module 104 along the conveyor system 108.

From 814, the process 800 may loop to 810 whereby the process 800 may continue to receive sensor data for making adjustment(s) to the lasing module 102. In some instances, the process 800 may additionally or alternatively include making adjustment(s) to the conveyor system 108, such as a speed at which the conveyor system 108 transports the build module 104 and/or an orientation of the build module 104.

Although the process 800 describes that the build modules 104 are moving while parts are manufactured, in some instances, the build modules 104 need not be moving and the lasing module 102 may be used to manufactured parts while the build modules 104 are stationary. For example, there may be some instances, such as large or complex parts, where the build module 104 is slowed or stopped below the lasing module 102 for a period of time. Additionally, the process 900 may be carried out in whole or in part by the computing resources 700. In such instances, the lasing module 102 may determine adjustments to the laser beams. For example, rather than the computing resources 700 instructing the lasing module 102, the lasing module 102 may adjustment mirrors for directing the lasers based on the sensor data collected.

Figure 9:
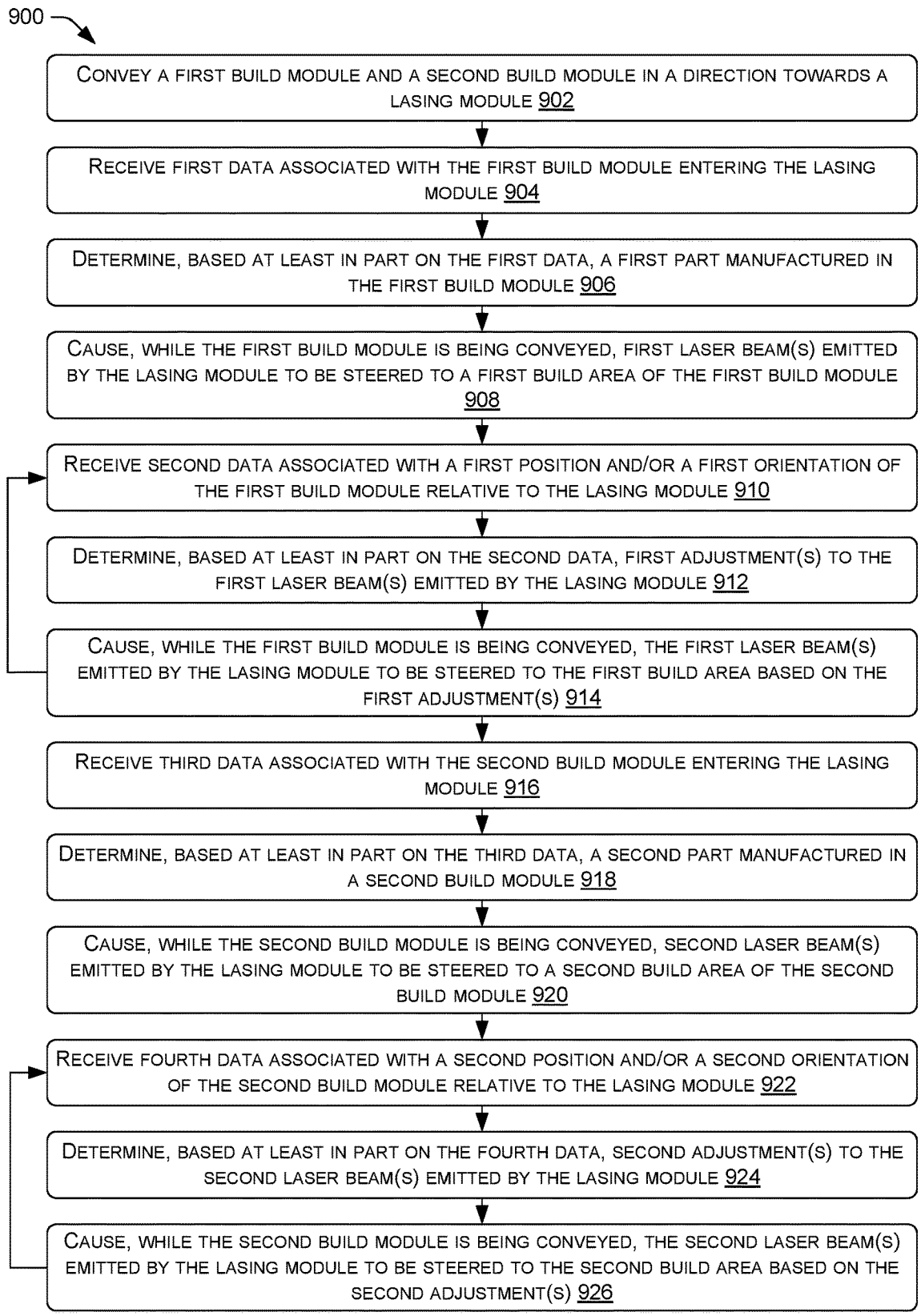
FIG. 9 illustrates an example process for manufacturing parts using the 3D printing system of FIG. 1, according to an example of the present disclosure.

FIG. 9 illustrates an example process 900 for manufacturing parts using the 3D printing system 100. In some instances, the process 900 may be performed by the 3D printing system 100, or components thereof.

At 902, the process 900 may include conveying a first build module and a second build module in a direction towards a lasing module. For example, the computing resource(s) 700 may transmit an instruction to the conveyor system 108, and in response, motors for of the conveyor system 108 may actuate for conveying a first build module and a second build module towards the lasing module 102.

In some instances, the first build module and the second build module may be conveyed along separate lanes that supply the build modules to the lasing module 102, respectively. Moreover, the conveyor system 108 may convey the first build module and the second build module at different speeds to the lasing module 102. The first build module and the second build module respectively include a build area on which powdered metal is disposed for manufacturing parts.

At 904, the process 900 may include receiving first data associated with the first build module entering the lasing module. For example, the computing resource(s) 700 may receive sensor data generated by sensor(s) of the lasing module 102, the conveyor system 108, or other devices disposed about an environment in which the 3D printing system 100 resides. In some instances, the sensor data received at 904 may correspond to image data of marker(s) (e.g., QR codes) on the first build module. As such, when the marker(s) come into view of the sensor(s), the sensor(s) may generate the sensor data.

At 906, the process 900 may include determining, based at least in part on the first data, a part to manufactured within the first build module. For example, the computing resource(s) 700 may process the sensor data to determine a part being manufactured within the first build module. In some instances, the computing resource(s) 700 may access the print job data 910 for knowing the part being manufactured in the first build module. That is, based on imaging the marker(s) on the first build module, such information may be used for determining the part being manufactured or a progress of the part being manufactured.

At 908, the process 900 may include causing, while the first build module is being conveyed, first laser beam(s) emitted by the lasing module to be steered to a first build area of the first build module. For example, the computing resource(s) 700, such as the coordinator component 714, may transmit instructions to the lasing module 102 for controlling an operation of the optical modules 116. Such control may include actuating mirror(s) and/or lens(es) of the optical modules 116, respectively, to adjust a steering of the and/or a spot size of the first laser beam(s). That is, after determining the part to be manufactured in the first build module, first laser(s) of the lasing module 102 are instructed to melt portions of the powdered metal within the first build area for manufacturing a portion of a part in the first build module. In some instances, the first laser beam(s) may be emitted by a portion of the laser(s) of the lasing module 102, and/or all of the laser(s) of the lasing module 102.

At 910, the process 900 may include receiving second data associated with a first position and/or a first orientation of the first build module relative to the lasing module. For example, the computing resource(s) 700 may receive sensor data associated with the position and/or orientation of the first build module. The sensor data may be generated by sensor(s) of the lasing module 102, the conveyor system 108, and/or other device(s) disposed about the environment of the 3D printing system 100. In some instances, the sensor data may be used to determine a full quaternion of the first build module (e.g., X position, Y position, Z position, roll, pitch, and yaw). The sensors that generate the sensor data may be arranged to image multiple side(s) and/or surface(s) of the first build module, such as the top and/or sides. Moreover, in some instances, the sensor(s) may be arranged to image fiducials on the first build module, such as the optical tape 402, for knowing the quaternion or for otherwise determining the position and/or orientation of the first build module.

At 912, the process 900 may include determining, based at least in part on the second data, first adjustment(s) to the first laser beam(s) emitted by the lasing module. For example, using the second data and after determining the position and/or orientation of the first build module, the computing resource(s) 700 may determine adjustment(s) such that the part in the first build module is manufactured accurately. As an example, the first build module may shift during transport along the conveyor system 108, and the adjustment(s) may serve to correct such shifts. Here, the computing resource(s) 700 may determine how to steer the first laser beam(s) and/or how to focus the first laser beam(s) to accurately manufacture the part. In some instances, the lasing module 102 itself may determine how to adjust the laser beam(s). For example, the lasing module 102 may determine corrections to apply for steering the laser beam(s) and/or adjusting a focal length of the laser beam(s) onto the first build area.

At 914, the process 900 may include causing, while the first build module is being conveyed, the first laser beam(s) emitted by the lasing module to be steered to the first build area based on the first adjustment(s). For example, the first adjustment(s) may be implemented by the lasing module 102 to actuate the mirror(s) such that the first laser beam(s) are steered to correct locations on the build area of the first build module. Additionally or alternatively, the lens(es) may be adjusted to alter a focal length of the first laser beam(s). Causing performance of the adjustment(s) therefore accounts for a position of the build module 104 relative to the lasing module 102 given the movement of the build module 104 along the conveyor system. From 914, the process 900 may loop to 910 whereby the process 900 may continue to receive sensor data for making adjustment(s) to the first laser beam(s). As such, regular and continuous measurements of the first build module may be recorded for use in steering and/or focusing the first laser beam(s).

Ultimately, however, the part being manufactured within the first build module (or a portion thereof) may be completed and the first build module exits the lasing module 102. In such instances, a new build module, such as a third build module, may enter the lasing module 102 and laser beam(s) may be steered and focused to create a portion of a new part in the third build module. A portion of the laser beam(s) may be steered towards the third build module, whereas another portion of the laser beam(s) may continue to be steered towards the first build module. In some instances, the lag time for steering the laser beam(s) from the first build module to the third build module (or other build modules within the lasing module 102), may be approximately 20 microseconds.

At 916, the process 900 may include receiving third data associated with the second build module entering the lasing module. For example, the computing resource(s) 700 may receive sensor data generated by sensor(s) of the lasing module 102, the conveyor system 108, or other devices disposed about an environment in which the 3D printing system 100 resides. In some instances, the sensor data received at 916 may correspond to image data of marker(s) (e.g., QR codes) on the second build module. As such, when the marker(s) come into view of the sensor(s), the sensor(s) may generate the sensor data.

At 918, the process 900 may include determining, based at least in part on the third data, a part to be manufactured within the second build module. For example, the computing resource(s) 700 may process the sensor data to determine a part being manufactured within the second build module. In some instances, the computing resource(s) 700 may access the print job data 910 for knowing the part being manufactured in the second build module.

At 920, the process 900 may include causing, while the second build module is being conveyed, second laser beam(s) emitted by the lasing module to be steered to a second build area of the second build module. For example, the computing resource(s) 700, such as the coordinator component 912, may transmit instructions to the lasing module 102 for controlling an operation of the optical modules 116. Such control may include actuating mirror(s) and/or lens(es) of the optical modules 116, respectively, to adjust a steering of the and/or a spot size of the second laser beam(s). That is, after determining the part to be manufactured in the second build module, second laser(s) of the lasing module 102 are instructed to melt portions of the powdered metal within the second build area.

In some instances, the second laser beam(s) may be different than the first laser beam(s) emitted by the lasing module 102. In other words, a first portion of the optical modules of the lasing module 102 may be steered to the first build area of the first build module, and a second portion of the optical modules of the lasing module 102 may be steered to the second build area of the second build module. In some instances, each of lasers of the optical modules may be capable of being steered to all locations within the first build area and the second build area.

In some instances, the first laser beam(s) and the second laser beam(s) may be manufacturing parts on the first build module and the second build module, respectively, during a time that at least partially overlaps. The lasing module 102 may therefore manufacture parts on multiple build modules simultaneously and as the build modules move through the lasing module 102.

At 922, the process 900 may include receiving fourth data associated with a second position and/or a second orientation of the second build module relative to the lasing module. For example, the computing resource(s) 700 may receive sensor data associated with the position and/or orientation of the second build module. The sensor data may be generated by sensor(s) of the lasing module 102, the conveyor system 108, and/or other device(s) disposed about the environment of the 3D printing system 100. In some instances, the sensor data may be used to determine a full quaternion of the second build module (e.g., X position, Y position, Z position, roll, pitch, and yaw).

At 924, the process 900 may include determining, based at least in part on the fourth data, second adjustment(s) to the second laser beam(s) emitted by the lasing module. For example, using the fourth data and determining the second position and/or second orientation of the second build module, the computing resource(s) 700 may determine the adjustment(s) such that the part in the second build module is manufactured accurately. As an example, the computing resource(s) 700 may determine how to steer the second laser beam(s) and/or how to focus the second laser beam(s) to accurately manufacture the part.

At 926, the process 900 may include causing, while the second build module is being conveyed, the second laser beam(s) emitted by the lasing module to be steered to the second build area based on the second adjustment(s). For example, the second adjustment(s) may be implemented by the lasing module 102 to actuate the mirror(s) such that the second laser beam(s) are steered to correct locations on the build area of the second build module. From 926, the process 900 may loop to 922 whereby the process 900 may continue to receive sensor data for making adjustment(s) to the second laser beam(s). Ultimately, however, the part being manufactured within the second build module (or a portion thereof) may be completed and exit the lasing module 102. In such instances, a new build module, such as a fourth build module, may enter the lasing module 102 and laser beam(s) may be steered and focused to create a portion of a new part in the fourth build module.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A system comprising:
 a lasing module including:
  a first laser that is configured to emit a first laser beam, and
  a second laser that is configured to emit a second laser beam;
 a first build module including a first build area in which a first part is to be manufactured;
 a second build module including a second build area in which a second part is to be manufactured; and
 a conveyor configured to convey the first build module while the first laser beam is emitted to manufacture at least a first portion of the first part and to convey the second build module while the second laser beam is emitted to manufacture at least a second portion of the second part, wherein the first laser beam and the second laser beam are emitted at least partially contemporaneously.

2. The system of claim 1, wherein:
 the first build module is disposed in a first lane of the conveyor; and
 the second build module is disposed in a second lane of the conveyor.

3. The system of claim 1, further comprising:
 one or more first sensors configured to sense the first build module for making one or more first adjustments to the first laser beam; and
 one or more second sensors configured to sense the second build module for making one or more second adjustments to the second laser beam.

4. The system of claim 3, wherein the one or more first sensors and the one or more second sensors couple to the lasing module.

5. The system of claim 1, further comprising a third build module including a third build area in which a third part is to be manufactured, the conveyor configured to convey the third build module while the third part is manufactured.

6. The system of claim 5, wherein:
 the lasing module further includes a third laser that is configured to emit a third laser beam; and
 the third part is to be manufactured by the third laser beam.

* * * * *